US011734411B2

(12) United States Patent
Miles

(10) Patent No.: US 11,734,411 B2
(45) Date of Patent: *Aug. 22, 2023

(54) MULTI-TRANSFER RESOURCE ALLOCATION USING MODIFIED INSTANCES OF CORRESPONDING RECORDS IN MEMORY

(71) Applicant: Stanley Kevin Miles, Foresthill, CA (US)

(72) Inventor: Stanley Kevin Miles, Foresthill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,486

(22) Filed: Sep. 2, 2022

(65) Prior Publication Data

US 2023/0004635 A1    Jan. 5, 2023

Related U.S. Application Data

(63) Continuation of application No. 17/828,731, filed on May 31, 2022, now Pat. No. 11,461,456, which is a
(Continued)

(51) Int. Cl.
*G06F 21/44* (2013.01)
*G06F 21/62* (2013.01)
(Continued)

(52) U.S. Cl.
CPC .............. *G06F 21/44* (2013.01); *G06F 12/14* (2013.01); *G06F 21/14* (2013.01); *G06F 21/31* (2013.01);
(Continued)

(58) Field of Classification Search
CPC .......... G06F 21/64; G06F 21/62; G06F 21/53; G06F 21/44; G06F 21/40; G06F 21/31; G06F 21/14
See application file for complete search history.

(56) References Cited

U.S. PATENT DOCUMENTS 5,857,023 A * 1/1999 Demers ............... G06Q 20/10
705/78
6,167,522 A * 12/2000 Lee ...................... H04L 63/101
713/165
(Continued)

OTHER PUBLICATIONS

N. Shone, C. Dobbins, W. Hurst and Q. Shi, "Digital Memories Based Mobile User Authentication for IoT," 2015 IEEE International Conference on Computer and Information Technology; Liverpool, UK, 2015, pp. 1796-1802. (Year: 2015).*
(Continued)

*Primary Examiner* — Kari L Schmidt
(74) *Attorney, Agent, or Firm* — Perkins Coie LLP

(57) ABSTRACT

In certain embodiments, resource allocation related to records may be facilitated by generating and using modified instances of such records. In some embodiments, a set of records associated with a user may be stored in a memory area, where each such record includes a record identifier. In response to obtaining one or more commands related to a resource transfer from a user device associated with the user, a new set of records associated with the user may be generated such that each record of the new set is (i) a modified instance of a corresponding record of the record set and (ii) includes a record identifier different from the record identifier of the corresponding record. In one use case, the new records and its data may then be utilized to perform operations related to the user commands. In another use case, the new records may replace its older corresponding records.

18 Claims, 6 Drawing Sheets

Related U.S. Application Data continuation of application No. 17/498,639, filed on Oct. 11, 2021, now Pat. No. 11,386,195, which is a continuation of application No. 17/234,856, filed on Apr. 20, 2021, now Pat. No. 11,176,240, said application No. 17/828,731 is a continuation-in-part of application No. 17/019,560, filed on Sep. 14, 2020, which is a continuation of application No. 15/833,660, filed on Dec. 6, 2017, now Pat. No. 10,803,432, which is a continuation-in-part of application No. 15/783,644, filed on Oct. 13, 2017, now abandoned, which is a continuation-in-part of application No. 15/187,469, filed on Jun. 20, 2016, now abandoned.

(60) Provisional application No. 62/553,671, filed on Sep. 1, 2017, provisional application No. 62/519,816, filed on Jun. 14, 2017, provisional application No. 62/182,369, filed on Jun. 19, 2015.

(51) Int. Cl.
*G06F 21/14* (2013.01)
*G06F 21/31* (2013.01)
*G06F 12/14* (2006.01)
*G06F 21/64* (2013.01)
*G06F 21/53* (2013.01)
*G06F 21/40* (2013.01)

(52) U.S. Cl.
CPC .............. *G06F 21/40* (2013.01); *G06F 21/53* (2013.01); *G06F 21/62* (2013.01); *G06F 21/64* (2013.01)

(56) References Cited

U.S. PATENT DOCUMENTS

| Patent/Pub No. | Date | Name | Classification |
|---|---|---|---|
| 8,528,083 B2* | 9/2013 | Lewis | G06F 21/53 726/1 |
| 8,959,609 B1* | 2/2015 | Newstadt | H04L 63/0884 713/171 |
| 9,015,824 B1* | 4/2015 | Drewry | H04L 9/32 726/6 |
| 9,104,519 B1* | 8/2015 | Newstadt | G06F 21/10 |
| 9,659,077 B2* | 5/2017 | Chen | G06F 16/275 |
| 10,614,213 B1* | 4/2020 | Demsey | G06F 21/552 |
| 11,017,109 B1* | 5/2021 | Yancey | G06N 20/00 |
| 11,455,616 B2* | 9/2022 | Morales | G06Q 20/3276 |
| 2002/0116549 A1* | 8/2002 | Raffaele | G06F 21/6263 719/330 |
| 2002/0144119 A1* | 10/2002 | Benantar | H04L 9/3263 713/171 |
| 2005/0091658 A1* | 4/2005 | Kavalam | G06F 21/6218 707/999.001 |
| 2005/0223118 A1* | 10/2005 | Tucker | H04L 67/1097 711/E12.067 |
| 2006/0031940 A1* | 2/2006 | Rozman | G06F 21/53 726/27 |
| 2008/0016339 A1* | 1/2008 | Shukla | G06F 21/54 713/164 |
| 2008/0320098 A1* | 12/2008 | Jung | H04L 51/212 709/217 |
| 2009/0019149 A1* | 1/2009 | Cohen | G06F 16/41 709/224 |
| 2009/0089803 A1* | 4/2009 | Biggs | G06F 21/554 726/21 |
| 2010/0082926 A1* | 4/2010 | Sahita | G06F 21/53 711/163 |
| 2010/0228975 A1* | 9/2010 | Lipka | H04L 63/04 713/168 |
| 2010/0257354 A1* | 10/2010 | Johnston | H04L 63/0428 713/153 |
| 2011/0191586 A1* | 8/2011 | Jung | H04L 9/3273 713/168 |
| 2011/0314070 A1* | 12/2011 | Brown | G06F 16/16 707/827 |
| 2012/0059911 A1* | 3/2012 | Randhawa | G16H 40/67 709/219 |
| 2012/0246075 A1* | 9/2012 | Rasti | H04L 63/0884 705/44 |
| 2012/0330845 A1* | 12/2012 | Kang | G06Q 20/3274 235/494 |
| 2013/0005488 A1* | 1/2013 | Evans | A63F 13/493 463/43 |
| 2013/0340051 A1* | 12/2013 | Gangaraj Manoharan | G06F 21/105 726/4 |
| 2014/0067654 A1* | 3/2014 | Hanson | G06Q 20/3223 705/39 |
| 2014/0084057 A1* | 3/2014 | Kirkham | G07F 17/0042 235/379 |
| 2014/0129428 A1* | 5/2014 | Tyler | G06Q 20/3276 705/39 |
| 2014/0279415 A1* | 9/2014 | Hazam | G06Q 20/10 705/39 |
| 2015/0096031 A1* | 4/2015 | Benoit | G06F 21/56 726/24 |
| 2015/0101069 A1* | 4/2015 | Stappenbeck | H04N 21/6581 726/30 |
| 2015/0347767 A1* | 12/2015 | Takemura | G06F 21/6245 713/193 |
| 2015/0371052 A1* | 12/2015 | Lepeshenkov | H04L 9/0866 713/165 |
| 2016/0134616 A1* | 5/2016 | Koushik | G06F 21/335 726/9 |
| 2016/0366541 A1* | 12/2016 | Jang | G06F 21/53 |
| 2017/0019413 A1* | 1/2017 | Dailly | H04W 12/64 |
| 2017/0364875 A1* | 12/2017 | Efroni | G06F 21/31 |
| 2018/0060250 A1* | 3/2018 | Hildesheim | G06F 12/1483 |
| 2018/0082054 A1* | 3/2018 | Khwaja | H04L 63/0428 |
| 2018/0096136 A1* | 4/2018 | LeMay | G06F 12/00 |
| 2018/0205552 A1* | 7/2018 | Struttmann | H04L 9/0637 |
| 2019/0007257 A1* | 1/2019 | Weinstein | H04L 63/0209 |
| 2020/0186355 A1* | 6/2020 | Davies | H04L 9/3221 |
| 2021/0035654 A1* | 2/2021 | Saroiu | G11C 29/16 |
| 2021/0132999 A1* | 5/2021 | Haywood | G06F 9/544 |
| 2021/0173918 A1* | 6/2021 | Khurana | G06F 16/248 |
| 2021/0209077 A1* | 7/2021 | Snellman | G06F 16/219 |
| 2021/0365366 A1* | 11/2021 | Kim | G06F 9/4881 |
| 2022/0078797 A1* | 3/2022 | Helms | H04L 51/18 |
| 2022/0197999 A1* | 6/2022 | Mo | G06F 21/31 |

OTHER PUBLICATIONS

Sven Kiljan, Koen Simoens, Danny De Cock, Marko Van Eekelen, and Harald Vranken. 2016. A Survey of Authentication and Communications Security in Online Banking. ACM Comput. Surv. 49, 4, Article 61 (Dec. 2017), 35 pages. (Year: 2017).*

* cited by examiner

MULTI-TRANSFER RESOURCE ALLOCATION USING MODIFIED INSTANCES OF CORRESPONDING RECORDS IN MEMORY

CROSS-REFERENCE TO RELATED APPLICATIONS

This application is a continuation of U.S. patent application Ser. No. 17/828,731, filed May 31, 2022, which is a continuation of U.S. patent application Ser. No. 17/498,639, filed Oct. 11, 2021, which is a continuation of U.S. patent application Ser. No. 17/234,856, filed Apr. 20, 2021. The content of each of the foregoing applications is incorporated herein in its entirety by reference.

U.S. patent application Ser. No. 17/828,731, filed May 31, 2022, is also a continuation-in-part of U.S. patent application Ser. No. 17/019,560, filed Sep. 14, 2020, which is a continuation of U.S. patent application Ser. No. 15/833,660, filed Dec. 6, 2017, which is a continuation-in-part of U.S. patent application Ser. No. 15/783,644, filed Oct. 13, 2017, which claims the benefit of priority of U.S. Provisional Patent Application No. 62/553,671, filed Sep. 1, 2017, and U.S. Provisional Patent Application No. 62/519,816, filed Jun. 14, 2017, and is also a continuation-in-part of U.S. patent application Ser. No. 15/187,469, filed Jun. 20, 2016, which claims the benefit of priority of U.S. Provisional Patent Application No. 62/182,369, filed Jun. 19, 2015. The content of each of the foregoing applications is incorporated herein in its entirety by reference.

BACKGROUND

As the world becomes more technologically advanced and dependent on computer systems, cyberattacks are increasing in sophistication and intensity. These attacks include the use of exploits to steal proprietary information, spread malware, or cause other problems. While existing defense and monitoring solutions help alleviate the risks of potential attacks, discovering data or security breaches can be difficult and, when/if finally discovered, significant negative effects from such events may have already occurred.

SUMMARY OF THE INVENTION

Aspects of the invention relate to methods, apparatuses, and/or systems for facilitating resource allocation, including, for example, performing a resource transfer using one or more modified instances of corresponding records in memory or other techniques described herein (e.g., to prevent unauthorized access of sensitive information or avoid/mitigate any negative effects when/if any unauthorized access of one or more areas of a system occurs).

In some embodiments, a primary set of records associated with a user may be stored in a first memory area (of a server computer system) associated with a user, and a secondary set of records associated with the user may be generated based on records of the primary set and stored in one or more memory areas (of the server computer system) associated with the user. An application may be hosted on the server computer system, where the application is configured to receive requests from a user to initiate an update related to a record associated with the user. An entitlement to access the memory areas may be provided to the application in response to obtaining one or more commands (e.g., that direct grant of the entitlement to the application) from a user device of the user. In response to the entitlement, the application may modify first and second records of the secondary set to reflect (i) a first transfer of at least some of a resource amount of the first record to the second record and (ii) a second transfer of at least some of a resource amount of the second record to one or more records associated with one or more users (e.g., other than the user). As an example, although the entitlement may provide the application access to the secondary set of records, the primary set of records (stored in the first memory area) is not accessible to the application. Moreover, the secondary set of records may be generated such that each record of the secondary set is a modified instance of a corresponding record of the primary set, where each record of the secondary set includes a resource amount and a record identifier different from the record identifier of the corresponding record of the primary set. As such, because each record of the secondary set is different from the corresponding record of the primary set, such data pertaining to the primary set (e.g., its record identifiers) is not even available to the application.

In some embodiments, the entitlement provided to the application may grant access to records of the primary set (e.g., in lieu of access to records of the secondary set). In response to the entitlement, the application may modify first and second records of the primary set to reflect (i) a first transfer of at least some of a resource amount of the first primary record to the second primary record and (ii) a second transfer of at least some of a resource amount of the second primary record to one or more records associated with one or more users (e.g., other than the user). In some embodiments, in response to the modification, and after generating/updating corresponding records of the secondary set, the primary records may be invalidated and deleted, thereby rendering such data ineffective for one or more operations (e.g., transfer of resources from such records) even if the data is somehow obtained by any bad actor. As an example, the records of the secondary set (e.g., which have record identifiers different from those of the primary set) may instead be designated as primary records and replace the corresponding primary records.

In some embodiments, a virtual sandbox environment may be created and executed, and the application may be hosted and installed in the virtual sandbox environment such that the application is prevented from accessing a resource outside of the virtual sandbox environment without one or more entitlements assigned to the application to access the resource. In some embodiments, in response to the application's modification of one of the primary or secondary set, the other corresponding set of records may be updated to reflect the respective first and second transfers, and the memory areas (storing the first and second records of the modified record set) may be reset. As an example, upon the reset, the entitlement is removed from the application, and the first and second records of the modified record set are deleted from the memory areas storing such records.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
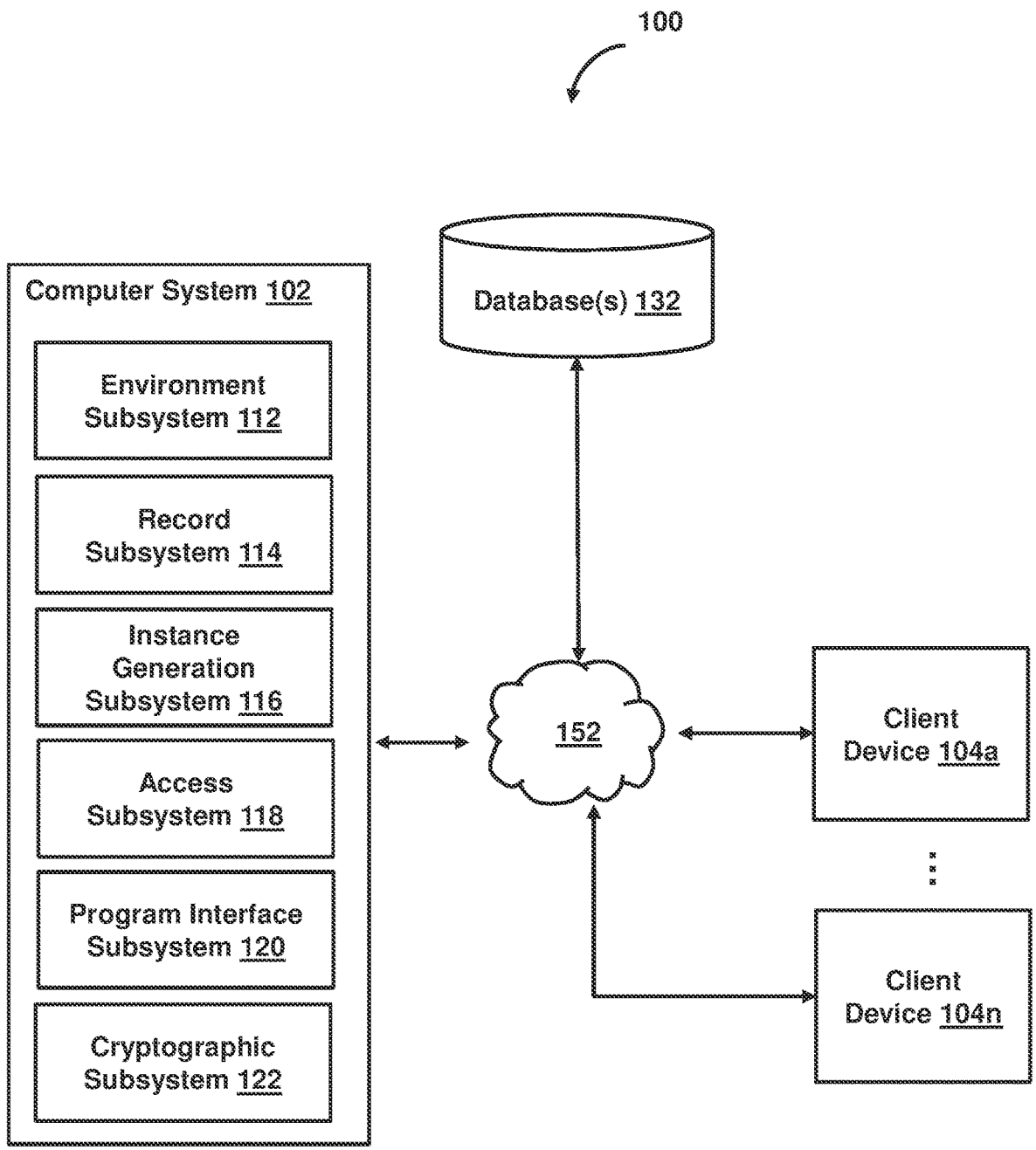
FIG. 1 shows a system for facilitating resource allocation, in accordance with one or more embodiments.

FIG. 1 shows a system 100 for facilitating resource allocation, in accordance with one or more embodiments. As shown in FIG. 1, system 100 may include computer system 102 (e.g., one or more servers, circuitry, one or more processors), client device 104 (or client devices 104a-104n), database 132, or other components (e.g., components described in U.S. patent application Ser. No. 15/833,660, filed on Dec. 6, 2017, or U.S. patent application Ser. No. 17/013,442, filed on Sep. 4, 2020, each of which is hereby incorporated herein by reference in its entirety). Computer system 102 may include environment subsystem 112, record subsystem 114, instance generation subsystem 116, access subsystem 118, program interface subsystem 120, cryptographic subsystem 122, or other components. Client device 104 may include any type of mobile terminal, fixed terminal, or other device. By way of example, client device 104 may include a desktop computer, a notebook computer, a tablet computer, a smartphone, a wearable device (e.g., a VR/AR headset, eye wear, or other wearable device), or other client device.

Users may, for instance, utilize one or more client devices 104 to interact with one another, one or more computer systems 102, or other components of system 100. It should be noted that, while one or more operations are described herein as being performed by components of computer system 102, those operations may, in some embodiments, be performed by components of client device 104 or other components of system 100, and, while one or more operations are described herein as being performed by components of client device 104, those operations may, in some embodiments, be performed by components of computer system 102 or other components of system 100.

In some embodiments, system 100 may host one or more applications configured to receive requests from a user to initiate an update related to a record associated with the user and facilitate one or more operations to effectuate such record update. Such an application may be configured so that the application is prevented from performing such operations until one or more entitlements are assigned to the application to access the relevant data or memory areas in which the relevant data is stored. As an example, upon expiration of the entitlements or completion of the record update (e.g., where the record update completion triggers the removal or expiration of the entitlements), the application may no longer have access to the relevant data or memory areas. In some embodiments, such an application may be hosted in a virtual sandbox environment that prevents the application from accessing a resource outside of the virtual sandbox environment without one or more entitlements assigned to the application to access the resource.

In some embodiments, system 100 may provide an entitlement to access one or more memory areas (or certain data therein) to an application, and, in response to the entitlement, the application may modify one or more records in the memory areas. As an example, the application may modify first and second records associated with a user to reflect (i) a first transfer of at least some of a resource amount of the first record to the second record, (ii) a second transfer of at least some of a resource amount of the second record to one or more records associated with one or more users (e.g., other than the user), or (iii) other transfers (e.g., from other users' records to the second record, from the second record to the first record, etc.).

In some embodiments, system 100 may generate a second set of records associated with a user based on one or more records of a first set of records associated with the user (e.g., that are stored in a first memory area) and store the second set of records in one or more other memory areas. In some embodiments, the second set of records may be generated to include one or more records that are each a modified instance of a corresponding record of the first set. As an example, each such record (or record instance) of the second set may include a resource amount (or quantity) and a record identifier different from the record identifier of the corresponding record of the first set.

In some embodiments, system 100 may provide an entitlement to access the first set of records (or the first memory area in which the records are stored) to the application in response to obtaining one or more commands from a user device of the user. As an example, the commands may direct grant of the entitlement to the application, a first transfer of at least some of a resource amount of a first record of the first set to a second record of the first set, a second transfer of at least some of a resource amount of the second record to one or more records associated with one or more users (e.g., the same user, a user other than the same user, etc.), or other operations. In response to the entitlement, the application may modify the first and second record instances of the first set to reflect the first and second transfers. In some embodiments, in response to the application's modification with respect to the first set, system 100 may generate or update the second set of records in the other memory areas to reflect the first and second transfers. In some embodiments, subsequent to the generation/update of the second set, system 100 may reset the first memory areas (storing the first and second records of the first set). As an example, as part of the reset, system 100 may cause the removal of the entitlement assigned to the application and delete the first and second record instances of the second set from the memory areas. In one use case, system 100 may reformat the first memory area, thereby erasing all data pertaining to the first and second records of the first set from the first memory area. In some embodiments, system 100 may designate the records of the first set (or portions thereof) as invalid, and the records of the first set may be deleted in response to the invalid designation. In this way, even if data pertaining to the first set (e.g., its record identifiers) are somehow obtained by any bad actors (e.g., that may intercept data transmitted by the application), such data will nevertheless be useless to those bad actors.

In some embodiments, in lieu of granting an entitlement to an application to access the first memory area or the first set of records (e.g., that are stored in the first memory area), system 100 may generate the second set of records associated with the user, store the second set of records in the other memory areas, and provide the application with an entitlement to access the other memory areas (or the records of the second set stored in the other memory areas). As indicated above, for example, the second set of records may be generated to include one or more records that are each a modified instance of a corresponding record of the first set. Thus, because each record instance of the second set is different from the corresponding record of the first set, such data pertaining to the first set (e.g., its record identifiers) may not be derived by the application or, as a result, by any bad actors that may intercept data transmitted by the application.

In some embodiments, system 100 may provide an entitlement to access the memory areas (in which the records/record instances of the second set are stored) to the application in response to obtaining one or more commands from a user device of the user. As an example, the commands may direct grant of the entitlement to the application, a first transfer of at least some of a resource amount of a first record instance of the second set to a second record instance of the second set, a second transfer of at least some of a resource amount of the second record to one or more records associated with one or more users (e.g., other than the user), or other operations. In response to the entitlement, the application may modify the first and second record instances of the second set to reflect the first and second transfers. In some embodiments, in response to the application's modification with respect to the second set, system 100 may update the first set of records in the first memory area to reflect the first and second transfers. Additionally, or alternatively, system 100 may reset the memory areas (storing the first and second records of the second set). As an example, as part of the reset, system 100 may cause the removal of the entitlement assigned to the application. As a further example, system 100 may delete the first and second record instances of the second set from the memory areas. In one use case, for example, system 100 may reformat the memory areas, thereby erasing all data pertaining to the first and second record instances of the second set from the memory areas.

In some embodiments, record subsystem 114 may store records associated with users and manage updating of the records. In some embodiments, instance generation subsystem 116 may generate instances of one or more records stored in one or more storage areas to enable (i) access to data of the records without necessarily enabling write access to the record data in the storage areas or (ii) access to data derived from the record data or other data related to the record data without enabling read or write access to the record data in the storage areas. As an example, the generated record instances may be exact copies of the records or modified instances of the records that are stored in one or more other storage areas.

In one use case, where a first set of records associated with a user are stored in a first storage area, a second set of records may be generated based on records of the first set such that each record of the second set is a modified instance of a corresponding record of the first set. In another use case, each record of the first set may include a record identifier, a resource amount (e.g., a quantity of a digital resource), a creation time (e.g., a creation date/time), a modification time (e.g., last modified date/time), one or more references to one or more associated records, or other data. A modified instance of a record of the first set may be generated (as part of the second set) based on the record of the first set such that the modified instance includes a record identifier different from the record identifier of the record of the first set. Additionally, or alternatively, a resource amount or other parameter value of the modified instance may be different from the resource amount or other parameter value of the record of the first set.

As an example, where records of the first set correspond to accounts of the user, the record identifiers of the records may be account identifiers of the accounts, and the resource amounts of the records may be an account balance (e.g., a current balance, an available balance, etc.). A modified instance of a record of the first set may be generated (as part of the second set) based on the record of the first set such that the modified instance includes an account identifier different from the account identifier of the record of the first set. In one scenario, as shown in Table 1 below, the account identifier (or one or more portions thereof) of the modified instance may be randomly generated (e.g., by executing one or more RdRand instructions and applying one or more seed values or via other pseudo-random generation) and associated with a creation time (e.g., a time at which the account identifier is generated, a time at which the new account instance is created, etc.) and one or more parameter values of the record of the first set. In a further scenario, the account identifier of the modified instance may additionally or alternatively be generated from a shared secret key (e.g., a key associated with the user, a key associated with the record set, etc.), the current time (e.g., the current date, the current date and hour, the current date and minute, or other current time measurement), or other input (e.g., the account identifier of the corresponding record of the first set). As an example, the shared secret key, the current time, and the account identifier of the record of the first set may be passed as inputs to a HMAC algorithm (e.g., HMAC-SHA1) or other algorithm to generate the account identifier of the modified instance. In another scenario, the account identifier of the modified instance may be a predefined identifier of a set of predefined identifiers associated with the user, and the modified instance may be generated to include the predefined identifier, one or more parameter values of the record of the first set, or other data.

TABLE 1

| Original Record | Modified Instance of the Record |
|---|---|
| Account Identifier: 6296911110 | Account Identifier: 8958205304 |
| Resource Amount: 8050 | Resource Amount: 8050 |
| Creation Time: 1/01/2020 8:00 | Creation Time: 12/21/2020 11:00 |
| [Other Parameter Values] | [Other Parameter Values] |

In some embodiments, access subsystem 118 may manage access controls associated with one or more users, one or more storage areas, one or more applications or system components, or data stored in the storage areas or related to the applications or system components. In some embodiments, access subsystem 118 may enable an application or system component to read from, write to, execute in one or more memory areas, or read or overwrite one or more data items (e.g., records, files, etc.) by modifying one or more access control lists associated with the memory areas or data items to specify which the software processes (e.g., related to the application or system component) have access to the memory areas or data items and the type of access associated therewith.

In some embodiments, program interface subsystem 120 may manage one or more application program interfaces (APIs) and facilitate routing and handling of API calls from one or more user applications located on one or more user devices or from one or more applications or system components located on one or more servers. In some embodiments, program interface subsystem 120 may obtain one or more commands from a user device of a user (e.g., via one or more API calls from a user application of the user device) and route the commands to the appropriate system components. As an example, if the commands direct grant of an entitlement to an application to access one or more memory areas or records stored therein, the commands (or portions thereof) may be routed to access subsystem 118 to determine whether the user is authorized to grant the entitlement to the application. As another example, if the commands direct a resource allocation or modification, the commands (or portions thereof) may be routed to record subsystem 114 or one or more applications to perform the resource allocation or modification. In some embodiments, the user device may include one or more components programmed to perform one or more operations of one or more user devices described in U.S. patent application Ser. No. 15/833,660, filed on Dec. 6, 2017, which is hereby incorporated herein by reference in its entirety.

In some embodiments, a transfer process is uniquely designed to require "reciprocal corresponding transfer commands." As an example, when resources are transferred by user command from a record to another record within one or more memory areas associated with the user, such reciprocal corresponding transfer commands may be required to be performed by the user to fulfill the transfer from one record to the other record. In one use case, when a user performs a transfer command to transfer digital resources (e.g., a certain resource quantity) from a record within a memory area associated with the user to another record therein, before the resources are allowed to move over into the other record, the user may be required to perform another command in the form of a reciprocal corresponding transfer command for the other record to accept the resources into the other record. In one use case, where a first record corresponds to a first account of the user and a second record corresponds to a second account of the user, a transfer of funds (e.g., a quantity of a fiat currency, a transfer of a quantity of a cryptocurrency or other digital currency, or other resource amount) from the first account to the second account may require two commands from a user device of the user—a first command directing a certain amount of funds out of the first account for transfer to the second account, and a second command accepting the amount of the funds into the second account. In some embodiments, such reciprocal corresponding transfer commands are inextricably part of such a system, where the functionality is built into the system so that it may require a user to perform the foregoing commands to complete the transfer process.

In some use cases, a user application on the user device may only require the user to perform a single user action to confirm the sending of both the first and second commands to effectuate the funds transfer from the first account to the second account. As an example, with respect to FIG. 3B, a user interface 320 of the user application may enable the user to tap or otherwise select (i) the "Accept" option 322 to cause the user application to send both the first and second commands to effectuate the funds transfer or (ii) the "Cancel" option 324 to cause the user application to go back to the prior screen (or go to another screen) without sending the first and second commands.

In other use cases, the user application may require the user to perform two separate user actions (e.g., one for each of the first and second commands) to send the first and second commands to effectuate the funds transfer from the first account to the second account. In some use cases, the accounts may be any account types described in U.S. patent application Ser. No. 15/833,660, and the funds transfer may be effectuated as part of a set of funds transfers in connection with payment from a payer to a biller for a transaction involving one or more items scanned at a point-of-sale system (e.g., a system including components for ultraviolet disinfecting and identification, as described in U.S. patent application Ser. No. 17/013,442, or other point-of-sale system).

In some embodiments, record subsystem 114 may configure one or more memory areas or records to be enabled or disabled for one or more operations related to one or more user commands or other triggers. As an example, a first memory area (e.g., with a designation as a primary memory area or other designation) may be configured such that (i) resources may be transferred into the records in the first memory area (e.g., accounts corresponding to such records may be credited) and (ii) resources may be transferred out of the records in the first memory area (e.g., accounts corresponding to such records may be debited). A second memory area (e.g., with a designation as a secondary memory area or other designation) may be configured such that (i) resources may be transferred into the records in the second memory area and (ii) resources may not be transferred out of the records of the second memory area. In some use cases, the second memory area may be configured to enable the records in the second memory area to be updated to reflect such modifications (e.g., transfers into or out of a record) made to corresponding records in the first memory area. Additionally, or alternatively, one or more records of a user may be configured (e.g., as part of or independently of the assigned memory area) in one or more of the foregoing manners.

As another example, one or more of the foregoing memory areas or records may be configured such that transfers of resources into or out of a record associated with a user requires one or more user commands from the user (e.g., a first user command for a transfer of resources out of a first record to a second record, a second user command for a transfer of resources into the second record from the first record, etc.). In one use case, such user commands may be required for both transfers of resources into and out of records within the same memory area associated with the user and transfers of resources into and out of records that are in different memory areas (e.g., memory areas associated with the same user but different sets of permissions or rules, memory areas associated with the same user but different hosting entities, memory areas associated with different users, etc.). In some use cases, such user commands may be required for transfers of resources into and out of records that are in different memory areas, but may not be required for transfers of resources into and out of records that are in the same memory area.

As a further example, one or more of the foregoing memory areas or records may be configured such that one or more operations that would impact the memory areas or records are temporarily disabled (e.g., disabled for a fixed time period, disabled while one or more temporary conditions are determined to be present, etc.). In one use case, when a first set of operations related to a first transaction (e.g., involving a set of records) is in progress or has been initiated, a second set of operations related to a second transaction will be paused or prevented from being performed (e.g., to the extent that the set of operations involve one or more records of the same set of records) at least until the first set of operations are completed.

In some embodiments, in response to one or more user commands, access subsystem 118 may provide an entitlement to access one or more memory areas (or certain data therein) to an application, and, in response to the entitlement, the application may modify one or more records in the memory areas. As an example, the application may modify first and second records associated with a user to reflect (i) a first transfer of at least some of a resource amount of the first record to the second record, (ii) a second transfer of at least some of a resource amount of the second record to one or more records associated with one or more other users, or (iii) other transfers (e.g., from other users' records to the second record, from the second record to the first record, etc.). In some embodiments, access subsystem 118 may associate the entitlement with an expiration time or one or more removal triggers (e.g., the entitlement is removed upon the occurrence of an event corresponding to the trigger). As an example, upon expiration of the entitlements or completion of the record update (e.g., where the record update completion triggers the removal or expiration of the entitlement), the application may no longer have access to the relevant data or memory areas.

Figure 2A:
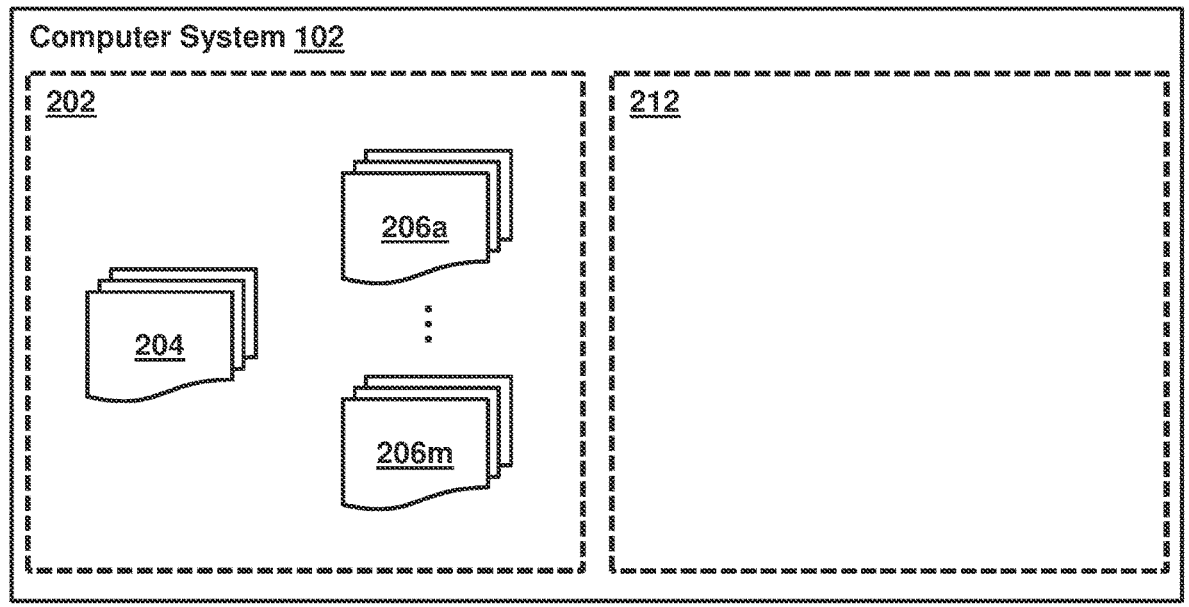
FIGS. 2A-2B show areas of a computer system and a set of records stored therein, in accordance with one or more embodiments.
Figure 2B:
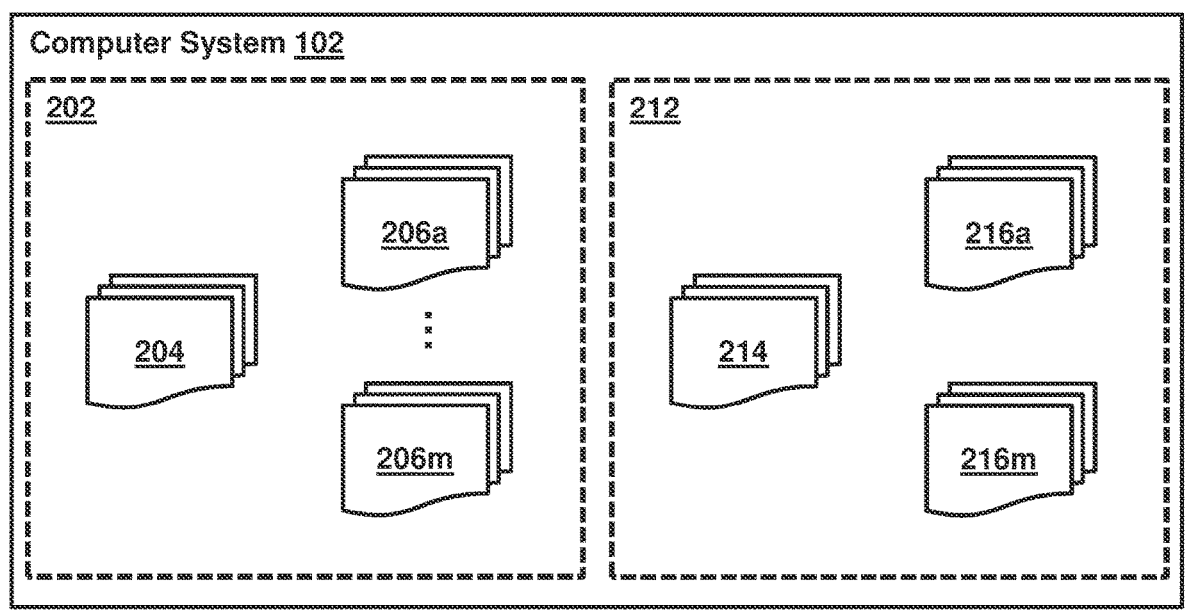

In some embodiments, in response to a command to grant an entitlement to an application to access one or more records (or instances of the records) of a first set of records associated with a user, record subsystem 114 may generate a second set of records associated with the user based on the records of the first set. In some embodiments, the second set of records may be generated such that each of the records of the second set is a modified instance of a corresponding record of the first set. As an example, a record of the second set may be generated such that at least a record identifier of the generated record may be different from the record identifier of the corresponding record of the first set. Additionally, or alternatively, a resource amount or other parameter value of the generated record may be different from the resource amount or other parameter value of the corresponding record of the first set. In one use case, with respect to FIG. 2A, memory area 202 may store the first set of records including records 204 and 206a-206m. In a further use case, with respect to FIG. 2B, in response to the command, the second set of records including records 214 and 216a-216m may be generated based on records 204 and 206a-206m, respectively. As an example, record 214 of the second set may be a modified instance of record 204 of the first set, and records 216a-216m of the second set may be modified instances of records 206a-206m, respectively.

In some embodiments, in response to obtaining one or more commands from a user device of a user, cryptographic subsystem 122 may perform verification of authentication data in connection with the commands. As an example, prior to performance of one or more instructions indicated by the commands, cryptographic subsystem 122 may obtain the authentication data from the user device and perform the verification of the authentication data. The authentication data may include a token, a digital signature, instances of records (e.g., of a record set), or other data used to indicate that the user is an owner of the records of the record set or one or more resources related to the records. In one use case, with respect to FIG. 3A, client device 104 may store one or more local copies 314 and 316a-316m of the records (e.g., records 204 and 206a-206m) in persistent storage of client device 104 (e.g., memory area 312 or other memory areas of client device 104), and client device 104 may generate the authentication data based on one or more portions of such local record copies 314 and 316a-316m. As an example, all the record identifiers of the local record copies 314 and 316a-316m may be combined in a specified order, the ordered combination may be provided as input to a one-way hash function, and the output of the hash function may be used to generate the authentication data. In one use case, an output hash value may be used as at least part of the authentication data, or the output hash value may be used in combination with other data to generate the authentication data. In another use case, the output hash value (or a data combination including the output hash value) may be encrypted using a private key (e.g., a key associated with the user, a key associated with the record set, etc.) to generate the authentication data.

In some embodiments, the validity of the authentication data may be based on whether the authentication data matches one or more records (or instances of the records) to which a request for access is related. As an example, with respect to Table 1 above, cryptographic subsystem 122 may determine whether the authentication data matches the original record, the instance of the record, or one or more records of the respective record set with which the original record or the instance is associated. If it is determined that a match exists, cryptographic subsystem 122 may determine that the authentication data is valid and enable the requested access. On the other hand, if it is determined that a match does not exist, cryptographic subsystem 122 may determine that the authentication data is invalid and decline the requested access.

In some embodiments, cryptographic subsystem 122 may perform the verification of the authentication data based on one or more records (or instances of the records) to which a request for access is related. In some embodiments, cryptographic subsystem 122 may generate a hash value related to one or more portions of the records (or instances of the records) and a reference value related to the authentication data, and the verification of the authentication data may be performed based on the hash value and the reference value. As an example, the verification may include comparing the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate that the authentication data is valid. A similarity score of FALSE may indicate that the authentication data is invalid.

In some embodiments, cryptographic subsystem 122 may hash one or more portions of the records (or instances of the records) to generate the hash value of the record portions. As an example, all the record identifiers of the records (or the instances of the records) may be combined in a specified order, and the ordered combination may be provided as input to a one-way hash function to output the hash value. As another example, all the record identifiers and the resource amounts of the records (or instances thereof) may be combined in a specified order, and the ordered combination may be provided as input to a one-way hash function to output the hash value. Additionally, or alternatively, one or more other parameter values of the records (or instances thereof) may be combined as part of the ordered combination used to generate the hash value.

In some embodiments, cryptographic subsystem 122 may obtain a public/private key and generate the reference value based on the authentication data and the key (e.g., a key associated with the user, a key associated with the respective record set, etc.). As an example, cryptographic subsystem 122 may obtain a public key that is part of a public/private key pair (associated with a private key used to generate the authentication data) and use the public key to decrypt the authentication data to generate the reference value.

In some embodiments, environment subsystem 112 may create and manage one or more environments in which one or more applications execute and operate. Such environments may include one or more memory areas in which the applications are installed and application data and other data accessible to the applications are stored. In some embodiments, such environments may include one or more virtual sandbox environments. As an example, each of the virtual sandbox environments may be a virtual space via which a tightly controlled set of resources are provided for one or more applications to execute and operate. Network access and the ability to access resources outside of the virtual sandbox environment (e.g., resources in memory areas outside of the virtual sandbox environment, resources in other virtual sandbox environments, reading of input devices, etc.) may be disabled or otherwise restricted by default. In one use case, the virtual sandbox environment may be configured to prevent an application installed therein from accessing a resource outside of the virtual sandbox environment without one or more entitlements assigned to the application to access the resource.

In some embodiments, through a grant of one or more entitlements, an application within a virtual sandbox environment may gain access to one or more memory areas and data outside of the virtual sandbox environment. As indicated herein, in some embodiments, one or more entitlements may be granted to the application in response to one or more user commands (e.g., directing such entitlement grants). As an example, with respect to FIG. 3A, memory area 302 may be allocated to the virtual sandbox environment, and a user command may be received from client device 104 that directs a grant of an entitlement to application 304 (e.g., installed in the virtual sandbox environment) to access memory areas 202 or 212 or data stored therein.

Figure 3A:
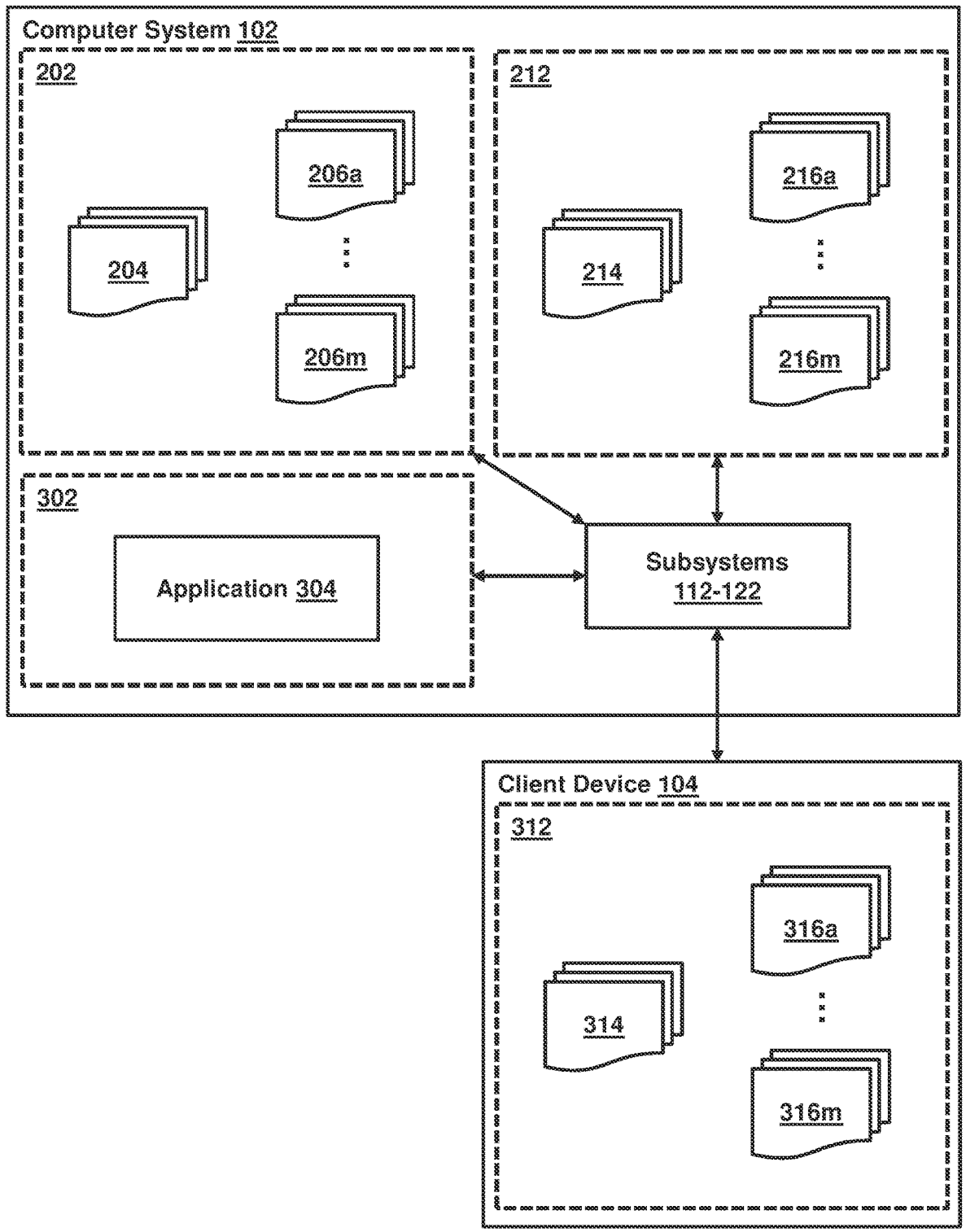
FIG. 3A shows a state of a computer system and a client device during a resource allocation triggered by the client device, in accordance with one or more embodiments.

In one use case, with respect to FIG. 3A, access subsystem 118 may provide an entitlement to application 304 to access memory area 202 or a first set of records associated with a user (e.g., including records 204 and 206*a*-206*m*) that are stored memory area 202. In another use case, in lieu of granting an entitlement to application 304 to access memory area 202 or a first set of records associated with a user (e.g., including records 204 and 206*a*-206*m*) that are stored memory area 202, record subsystem 114 may generate a second set of records (e.g., including records 214 and 216*a*-216*m*) based on one or more records of the first set (e.g., records 204 and 206*a*-206*m*), store the second set of records in memory area 212, and provide the application with an entitlement to access memory area 212 (or the second set of records stored therein). As indicated herein, in a further use case, record 214 of the second set may be a modified instance of record 204 of the first set, and records 216*a*-216*m* of the second set may be modified instances of records 206*a*-206*m*, respectively. In this way, because each such record of the second set is different from the corresponding record of the first set, such data pertaining to the first set (e.g., its record identifiers) may not be derived by the application or, as a result, by any bad actors that may intercept data transmitted by the application.

In some embodiments, in response to modification of one or more records in a given memory area (e.g., by the application in the virtual sandbox environment), record subsystem 114 may update one or more corresponding records in a corresponding memory area to reflect the modification of the records in the given memory area. As an example, where the modification is made to effectuate a transfer of at least some of a resource amount of a first record in a first memory area to a second record in the first memory area, the corresponding records in a second memory area may be updated to reflect the transfer. As another example, where the modification is made to effectuate a transfer of at least some of a resource amount of a first record in the second memory area to a second record in the second memory area, the corresponding records in the first memory area may be updated to reflect the transfer.

In some embodiments, in response to completing the update of the corresponding records in the first or second memory area, environment subsystem 112 may perform a reset of the other memory area (storing the records modified by the application) to one or more default settings. As an example, as part of the reset, the entitlement assigned to the application may be removed. As a further example, the reset may cause the records modified by the application to be deleted from the other memory area. In one use case, for example, the other memory area may be reformatted, thereby erasing all data pertaining to the records from the other memory area.

In some embodiments, where the first memory area is initially designated as a primary memory area (or part of the primary memory area) associated with the user, and the second memory area is initially designated as a secondary memory area (or part of the secondary memory area), record subsystem 114 may modify one or more such designations to reflect the current state. As an example, where the records in the first memory area are deleted (or the first memory area is reset) (e.g., in favor of the corresponding record instances in the second memory area), the second memory area may be designated as the primary memory area (or part of the primary memory area) associated with the user (e.g., to indicate the record instances in the second memory area as the current state of the user's records). In some use cases, the first memory area may be designated as the secondary memory area (or part of the secondary memory area). In some use cases, when such designation is updated for a memory area, the memory area may be configured with permissions or rules subject to such designation. As an example, when designated as a primary memory area, the memory area may be configured such that (i) resources may be transferred into the records in the memory area (e.g., accounts corresponding to such records may be credited) and (ii) resources may be transferred out of the records in the memory area (e.g., accounts corresponding to such records may be debited). When designated as a secondary memory area, the memory area may be configured such that (i) resources may be transferred into the records in the memory area and (ii) resources may not be transferred out of the records of the memory area.

In some embodiments, where one or more records stored in a given memory area are modified by an application in response to one or more commands obtained from a user device, cryptographic subsystem 122 may obtain confirmation data from the user device and perform verification of the confirmation data. As an example, the user device (e.g., a client device 104) may store an instance of a first set of records (e.g., stored in a first memory area associated with computer system 102), and the user device may generate an updated instance of the first set of records reflecting first and second transfers in connection with transmitting one or more commands directing such transfers (e.g., a transfer of at least some of the resource amount of a first record of the first set of records to a second record of the first set of records, a transfer of at least some of the resource amount of the second record to one or more records associated with one or more users, etc.). The user device may generate the confirmation data based on one or more portions of records of the updated instance set stored at the user device and transmit the confirmation data to computer system 102 to enable computer system 102 to confirm the current updated state of corresponding records stored by computer system 102. As another example, the confirmation data may include a token, a digital signature, instances of records of the updated instance set stored at the user device, or other data used to confirm whether the current updated state of corresponding records stored by computer system 102 matches the records of the updated instance set (or record data thereof) stored at the user device.

In one use case, with respect to FIG. 3A, client device 104 may store one or more local copies 314 and 316a-316m of the records of the first set of records (e.g., records 204 and 206a-206m). In connection with transmitting one or more commands directing a modification (e.g., a resource allocation or other modification) related to the first set of records, client device 104 may generate an updated instance of the first set of records reflecting such modification. Client device 104 may then use one or more portions of records of the updated instance set to generate the confirmation data and transmit the confirmation data to computer system 102.

As an example, to generate the updated instance of the first set of records, client device may update the local copies 314 and 316a-316m to reflect the modification in accordance with the commands. As another example, client device 104 may generate a modified instance for each record of the local copies 314 and 316a-316m (e.g., via one or more techniques described herein) such that the modified record instance includes a record identifier different from the record identifier of the record of the first set copies. Each such modified record instance may be generated/updated to reflect the modification in accordance with the commands. In one scenario, the record identifier of the modified record instance may be generated from a shared secret key (e.g., a key associated with the user, a key associated with the record set, etc.), the current time (e.g., the current date, the current date and hour, the current date and minute, or other current time measurement), or other input (e.g., the record identifier of the corresponding record of the first set copies). In a further scenario, the shared secret key, the current time, and the record identifier of the record of the first set copies may be passed as inputs to a HMAC algorithm (e.g., HMAC-SHA1) or other algorithm to generate the record identifier of the modified record instance.

As another example, to generate the confirmation data, all the record identifiers of the records of the instance set (e.g., the updated local copies 314 and 316a-316m, record instances of the updated local copies 314 and 316a-316m, etc.) may be combined in a specified order, the ordered combination may be provided as input to a one-way hash function, and the output of the hash function may be used to generate the confirmation data. As another example, an output hash value may be used as at least part of the confirmation data, or the output hash value may be used in combination with other data to generate the confirmation data. As another example, the output hash value (or a data combination including the output hash value) may be encrypted using a private key (e.g., a key associated with the user, a key associated with the record set, etc.) to generate the confirmation data.

In a further use case, computer system 102 may use the confirmation data to determine whether the first set of records or a corresponding set of records (e.g., records 204 and 206a-206m or records 214 and 216a-216m as modified or otherwise updated in connection with the commands from the user device) matches the updated instance set stored at the user device. As an example, computer system 102 may use the confirmation data to confirm whether one or more portions of records of the first set of records (e.g., records 204 and 206a-206m as modified or otherwise updated in connection with the commands from the user device) are the same as one or more portions of records of the updated instance set stored at the user device (e.g., the same record identifiers, the same resource amounts, the same creation times, etc.). Likewise, as another example, computer system 102 may use the confirmation data to confirm whether one or more portions of records of the corresponding set of records (e.g., records 214 and 216a-216m as modified or otherwise updated in connection with the commands from the user device) derived from the first set of records are the same as one or more portions of records of the updated instance set stored at the user device (e.g., the same record identifiers, the same resource amounts, the same creation times, etc.).

In some embodiments, where the commands from the user device direct (i) a first transfer of at least some of the resource amount of the first record of the first set of records to the second record of the first set of records and (ii) a transfer of at least some of the resource amount of the second record to one or more records associated with one or more users, cryptographic subsystem 122 may perform verification of the confirmation data (obtained from the user device) prior to performing deletion of the first set of records from the first memory area (or corresponding records in a corresponding memory area associated with computer system 102), a reset of the first memory area (or a corresponding memory area associated with computer system 102), or one or more other operations. As an example, the deletion, reset, or other operations may be performed in response to the verification indicating a match between the relevant set of records at computer system 102 and the updated instance set at the user device. As another example, the deletion, reset, or other operations may not be performed in response to the verification indicating a lack of a match between the relevant set of records at computer system 102 and the updated instance set at the user device. In one scenario, where there is a lack of a match, an error may be returned to the user device, and the user device may revert its record state to the prior instance set (e.g., by reverting any changes, by deleting the updated instance set and setting or maintaining the original instance set as the current state, etc.). Likewise, in a further scenario, similar operations may be performed at computer system 102 with respect to the first set of records or a corresponding set of records derived from the first set of records at computer system 102.

In some embodiments, verification of the confirmation data may include generating a hash value related to one or more portions of the records (of the first set of records or the corresponding set of records) and a reference value related to the confirmation data, and then comparing the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate a match between the relevant set of records at computer system 102 and the updated instance set at the user device. A similarity score of FALSE may indicate that a lack of a match between the relevant set of records at computer system 102 and the updated instance set at the user device.

In some embodiments, cryptographic subsystem 122 may hash one or more portions of the records to generate the hash value of the record portions. As an example, all the record identifiers of the records may be combined in a specified order, and the ordered combination may be provided as input to a one-way hash function to output the hash value. As another example, all the record identifiers and the resource amounts of the records (or instances thereof) may be combined in a specified order, and the ordered combination may be provided as input to a one-way hash function to output the hash value. Additionally, or alternatively, one or more other parameter values of the records (or instances thereof) may be combined as part of the ordered combination used to generate the hash value. In some embodiments, cryptographic subsystem 122 may obtain a public/private key and generate the reference value based on the confirmation data and the key (e.g., a key associated with the user, a key associated with the respective record set, etc.). As an example, cryptographic subsystem 122 may obtain a public key that is part of a public/private key pair (associated with a private key used to generate the confirmation data) and use the public key to decrypt the confirmation data to generate the reference value.

In some embodiments, a server system (e.g., computer system 102) may store a first set of records associated with a user in a first memory area, and a user device (e.g., client device 104) of the user may store a local instance of the first set of records. In response to the user device sending one or more commands to the server system, the server system may modify one or more records of the first set (or one or more other records) in accordance with the user commands. As an example, the commands may direct (i) a transfer of a resource amount of a first record of the first set to a second record of the first set, (ii) acceptance of the resource amount into the second record from the first record, (iii) a transfer of another resource amount of another record to one or more records, (iv) an acceptance of the other resource amount into one or more records from the other record, or (v) other operations. The server system may thus modify the records of the first set (or the other records) to reflect or represent such transfers, acceptances, or other operations.

Prior to performing the modification, the server system may obtain and perform verification of authentication data from the user device (e.g., to ensure that the user is the owner of the accounts corresponding to the records to be modified). In response to determining that the authentication data is valid, the server system may modify the records of the first set in accordance with the user commands. As an example, the validity of the authentication data may demonstrate that the user device has one or more data items that only the user (or only the user and an entity hosting the user's corresponding accounts) should have, such as (i) copies of records of the first set of records stored in the first memory area of the server system, (ii) a particular private key (e.g., a key associated with the user, a key associated with the record set, etc.), or (iii) other data items.

In response to the user commands and determining that the authentication data is valid, the server system may generate/update a second set of records associated with the user in a second memory area of the server system based on records of the first set such that each record of the second set (i) is a modified instance of a corresponding record of the first set and (ii) includes a record identifier different from the record identifier of the corresponding record of the first set. As an example, where the second set of records is generated or updated to reflect the foregoing transfers, acceptances, or other operations (that are directed by the user commands), each record (or record instance) of the second set may include the same resource amount as the corresponding record of the first set, even though the record instance of the second set may include a different record identifier than the corresponding record of the first set.

In some embodiments, the user device may likewise generate/update another set of records based on the local instance of the first set of records stored on the user device such that each record of the generated/updated set (i) is a modified instance of a corresponding record of the first set and (ii) includes a record identifier different from the record identifier of the corresponding record of the first set. As with the second set of records at the server system, each such modified record instance may be generated/updated to reflect the foregoing transfers, acceptances, or other operations (that are directed by the user commands). Both the server system and the user device may employ the same techniques to generate the second set of records and the modified record instances, respectively, to have the same data (e.g., the same record identifiers, the same resource amounts, etc., see Table 2 below) without needing to share such data with one another or otherwise transmit such data outside their respective secure locations. As an example, in one scenario, both the server system and the user device may generate the record identifier of their respective modified record instance from a shared secret key, the current time, or other input (e.g., the record identifier of the corresponding record of the first set). In a further scenario, both the server system and the user device may pass the shared secret key, the current time, and the record identifier of the record of the first set copies as inputs to a HMAC algorithm to generate the record identifier of the modified record instance (e.g., where the shared secret key to the form the "seed," and the current time and the record identifier are used to form the "message").

TABLE 2

| Records at Server and User Device | Modified Instances at Server and User Device |
|---|---|
| Record A: | Record A': |
| Account Identifier: 6296911110 | Account Identifier: 8958205304 |
| Resource Amount: 7020 | Resource Amount: 7020 |
| [Other Parameter Values] | [Other Parameter Values] |
| Record B: | Record B': |
| Account Identifier: 3465215782 | Account Identifier: 8752452468 |
| Resource Amount: 0 | Resource Amount: 0 |
| [Other Parameter Values] | [Other Parameter Values] |

In some embodiments, the server system may obtain and perform verification of confirmation data from the user device to confirm that the server system and the user device have the same updated records. As an example, the validity of the confirmation data may demonstrate that the modified record instances generated by the user device are the same as the records of the second set of records generated by the server system. In this way, for example, where the modified record instances are later used by the user device to generate its authentication data (e.g., to demonstrate that the user is the owner of the accounts corresponding to the records to be modified), the foregoing confirmation process may ensure that the user can use the user device to perform modifications or other operations with respect to the records at the server system.

In some embodiments, with respect to generation of the confirmation data, the user device may combine all the record identifiers of the modified record instances, provide the ordered combination as input to a one-way hash function, and use the output of the hash function to generate the confirmation data. As another example, an output hash value may be used as at least part of the confirmation data, or the output hash value may be used in combination with other data to generate the confirmation data. As another example, the output hash value (or a data combination including the output hash value) may be encrypted using a private key (e.g., a key associated with the user, a key associated with the record set, etc.) to generate the confirmation data.

The server system may perform verification of the confirmation data by generating a hash value related to one or more portions of the records (of the second set of records) and a reference value related to the confirmation data, and then compare the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate a match between the relevant set of records at the server system and the modified record instances generated by the user device, thereby indicating that the confirmation data is valid. A similarity score of FALSE may indicate that a lack of a match between the relevant set of records at the server system and the modified record instances generated by the user device, thereby indicating that the confirmation data is invalid.

In some embodiments, in response to determining that the confirmation data is valid (e.g., confirming that the server system and the user device have the same updated records), the server system may designate the second set of records as a primary set of records for the user (e.g., in lieu of the first set of records being the primary set of records). The user device may likewise designate the modified record instances as a primary set of records for the user at the user device (e.g., in lieu of the prior copies of the first set of records being the primary set of records for the user at the user device). Additionally, or alternatively, in response to determining that the confirmation data is valid, the server system may remove the first set of records from the first memory area (e.g., by deleting the first set of records or moving the first set of records to an archive database or other storage area) and move the second set of records into the first memory area (e.g., to replace the first set of records). As a further example, the server system may reformat the first memory area, thereby erasing all data pertaining to the first set from the first memory area.

Figure 3B:
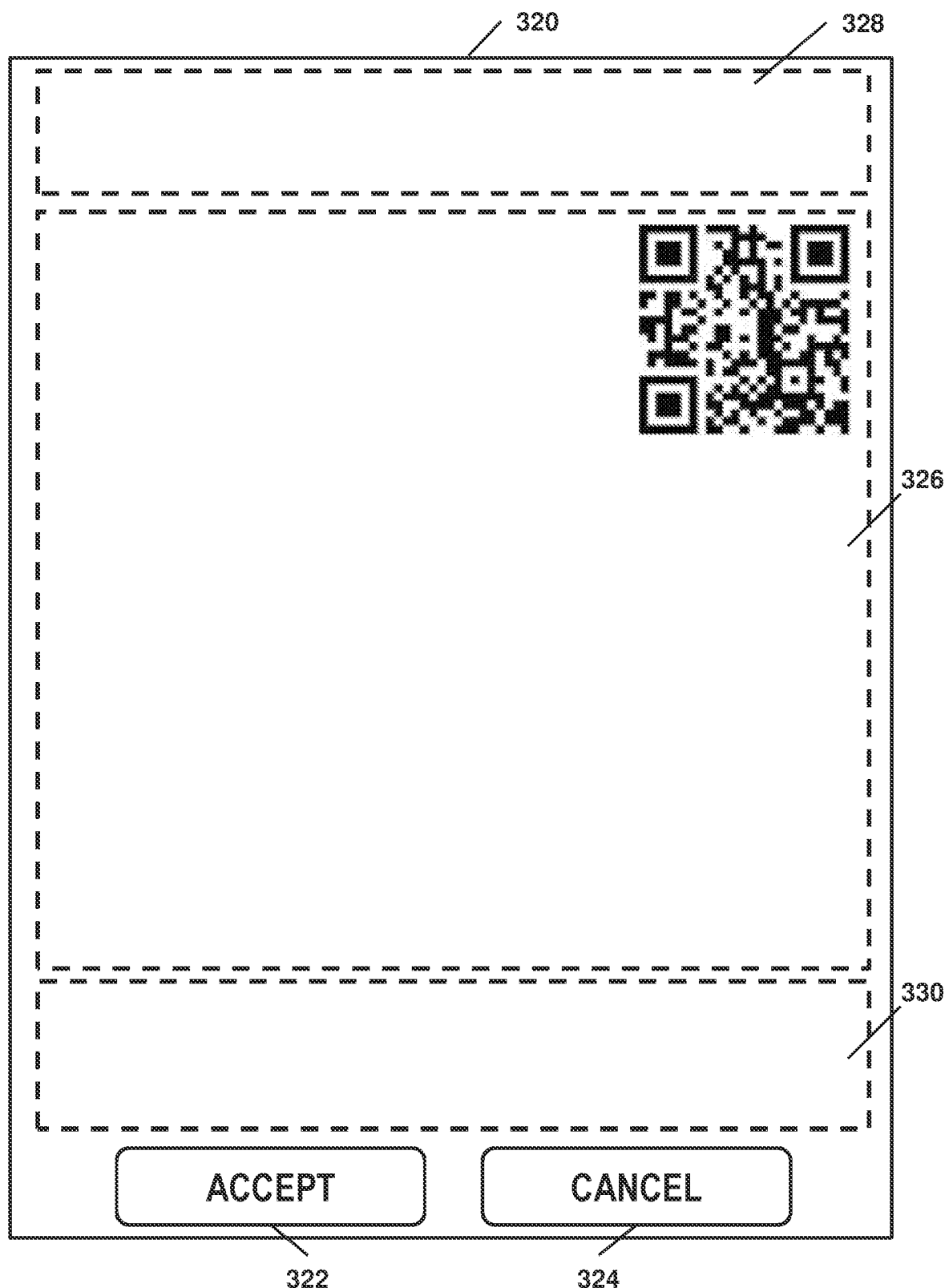
FIG. 3B shows a user interface that enables a user to initiate one or more user commands related to one or more records, in accordance with one or more embodiments.

In one use case, with respect to FIG. 3B, when the QR code (or other code type) (shown in FIG. 3B) is captured by a camera (or other data capture device) of a user device, a user application may process the QR code to obtain data related to the QR code (e.g., data represented by the QR code, data accessible via a hyperlink represented by the QR code, etc.) and present at least some of the related data on one or more areas 326, 328, or 330 of the user interface 320. The related data may include instructions on where resources are to be directed (e.g., from an account of the user to another account of the user, from an account of the user to an account of one or more other users, etc.), the purchase data shown in Table 3 below, or other data. The user application may, for example, present the purchase data in area 326 without presenting any or all of the data pertaining to the instructions on where the resources are to be directed (e.g., potentially sensitive information such as full account identifiers may not be shown). If the user selects the "Accept" option 322, the user application may send two or more commands to a server system to effectuate the funds transfer related to the purchase data shown in Table 3 below, such as a first command directing a certain amount of funds out of a first account of the user for transfer to a second account of the user, a second command accepting the amount of the funds into the second account, and a third command directing the amount (or another amount) of the funds out of the second account for transfer to one or more accounts of the biller. In some use cases, in lieu of the user selection of the "Accept" option 322, the user application may be pre-configured to automatically send the user commands in response to scanning the QR code and obtaining the related QR code data (e.g., sending the user commands without requiring the user to indicate any transfer amounts or payees subsequent to the QR code scan).

TABLE 3

| | |
|---|---|
| Purchase: 01/31/2021 at 12:15 pm | |
| Point of Sale Biller | |
| Store Number: 520 | |
| Ream of Paper | $5.00 |
| Pens | $1.00 |
| Ink Cartridge | $30.00 |
| Stapler | $27.00 |
| Subtotal | $63.00 |
| Tax | $6.00 |
| Total | $69.00 |

In response to obtaining the user commands from the user device, the server system may perform authentication of the user (e.g., to ensure that the user is the owner of the accounts out of which funds are transferred). As an example, the server system may use the user commands to identify a first set of records (e.g., stored in a first memory area at the server system) that corresponds to the accounts of the user and perform the authentication by confirming that the user device already has a local copy of the first set of records (e.g., without requiring any portion of the first set of records to be sent from the server system to the user device or any portion of the local copy to be sent from the user device to the server system).

In response to the user commands and the authentication being successful, the server system may modify the records of the first set in accordance with the user commands (e.g., modifying the records to reflect or represent transfers, acceptances, or other operations that are directed by the user commands). The user device may also modify its local instance of the records of the first set to reflect or represent transfers, acceptances, or other operations that are directed by the user commands. Additionally, or alternatively, the server system may generate/update a second set of records associated with the user (e.g., in a second memory area of the server system) based on records of the first set such that each record of the second set (i) is a modified instance of a corresponding record of the first set and (ii) includes a record identifier different from the record identifier of the corresponding record of the first set. As an example, where the second set of records is generated or updated to reflect the foregoing transfers, acceptances, or other operations (that are directed by the user commands), each record (or record instance) of the second set may include the same resource amount as the corresponding record of the first set, even though the record instance of the second set may include a different record identifier than the corresponding record of the first set.

The user device may likewise generate/update another set of records based on the local instance of the first set of records stored on the user device such that each record of the generated/updated set (i) is a modified instance of a corresponding record of the first set and (ii) includes a record identifier different from the record identifier of the corresponding record of the first set. As with the second set of records at the server system, each such modified record instance may be generated/updated to reflect the foregoing transfers, acceptances, or other operations (that are directed by the user commands). Both the server system and the user device may employ the same techniques to generate the second set of records and the modified record instances, respectively, to have the same data (e.g., the same record identifiers, the same resource amounts, etc., see Table 2 above) without needing to share such data with one another or otherwise transmit such data outside their respective secure locations. As an example, in one scenario, both the server system and the user device may generate the record identifier of their respective modified record instance from a shared secret key, the current time, or other input (e.g., the record identifier of the corresponding record of the first set).

The server system may perform a confirmation process to ensure that the server system and the user device have the same updated records (e.g., without requiring any portion of the updated records to be sent to/from the server system from/to the user device). As an example, the confirmation process may demonstrate that the modified record instances generated by the user device are the same as the records of the second set of records generated by the server system. In this way, for example, the user device may subsequently use the modified record instances (stored at the user device) to authenticate a subsequent transaction involving the accounts corresponding to the modified record instances.

In response to confirming that the server system and the user device have the same updated records, the server system may designate the second set of records as a primary set of records for the user (e.g., in lieu of the first set of records being the primary set of records). The user device may likewise designate the modified record instances as a primary set of records for the user at the user device (e.g., in lieu of the prior copies of the first set of records being the primary set of records for the user at the user device). Additionally, or alternatively, in response to determining that the confirmation data is valid, the server system may remove the first set of records from the first memory area (e.g., by deleting the first set of records or moving the first set of records to an archive database or other storage area) and move the second set of records into the first memory area (e.g., to replace the first set of records).

In some use cases, the foregoing operations after the user commands (e.g., operations related to the authentication, record modification/update, confirmation, designation, record deletion or movement, etc.) may be performed automatically by the server system and the user device, respectively, without receiving user input after the user commands are sent from the user device to the server system. In other use cases, before the modified record instances are designated as a primary set of records for the user (or replaces their respective original records), the server system or the user device may require the user to manually "accept" the results. With respect to FIG. 3B, for example, the user may be presented with the purchase data shown in Table 3 above, and the user may be required to either accept or reject the results by selecting the "Accept" option 322 or the "Cancel" option 324. If the user selects the "Accept" option 322, the user device may send a user command to the server system directing the designation or replacement operations, causing the server system to perform such operations in response to the user selection (e.g., thereby designating the modified record instances as representing the current state of the user's accounts). As another example, if the user selects the "Cancel" option 324, the user device may send a user command to the server system to roll back the operations that occurred pursuant to the initial user commands, and the server system may perform such roll back operations in response to the user selection.

In some use cases, even if the respective "original" records are deleted or moved (e.g., to an archive database or area), data of the original records may be mapped to the user (e.g., via a user identifier of the user) or the records representing the current state of the user's accounts. As an example, with respect to Table 2 above, even if Records A and B corresponding to account identifiers "6296911110" and "3465215782" are no longer updated (e.g., as a result of being deleted or moved), the server system may maintain historical data that links the two account identifiers (or other parameter values of Records A and B) to the user or, respectively, to the new Records A' and B' corresponding to account identifiers "8958205304" and "8752452468." As another example, such historical data may be stored in association with the user or, respectively with the new Records A' and B' in a profile of the user, in a historical database, or other area related to the server system. As such, when the prior account identifiers or data (e.g., corresponding to Records A and B) are available, they may be used to facilitate receipt of funds (e.g., refunds or other receipt of funds), accounting, or other operations. With respect to refunds, for example, a directory or other component of the server system may use the historical data to apply a refund specified for Records A or B to Records A' or B', respectively.

In a further use case, the data of each of the original records and its corresponding record (representing the current state of the corresponding account) may be mapped to another record identifier (e.g., a master account identifier, other primary identifier, etc.), which can be used to determine the corresponding current-state record from the original record (or vice versa). As an example, with respect to Table 2 above, the server system may store a first master account identifier in association with Records A and A' (or their respective account identifiers "6296911110" and "8958205304") in a database. Additionally, or alternatively, the server system may store a second master account identifier in association with Records B and B' (or their respective account identifiers "3465215782" and "8752452468") in the database, and so on. The foregoing association, for example, may be used by a directory or other component of the server system to facilitate receipt of funds (e.g., refund or other receipt of funds), generation of reports, or other operations (e.g., operations involving linking of corresponding accounts with one another).

As another example, when a refund (or other receipt of funds) is directed to the account identifier "3465215782" (of Record B) after Record B has been replaced by Record B' (or archived, deleted, designated as a secondary record, etc., in favor of Record B'), the server system may perform a query with the account identifier of Record B to determine the account identifier "8752452468" (of Record B'). In one scenario, upon receipt of the account identifier of Record B as part of the query, a database may return the second master account identifier associated with Record B, and the server system may perform another query with the second master account identifier (e.g., at the same database or a different database) to obtain the account identifier of Record B'. In another scenario, upon receipt of the account identifier of Record B as part of the query, the database may use the account identifier of Record B to retrieve the second master account identifier associated with Record B and subsequently use the second master account identifier to retrieve and return the account identifier of Record B'. Upon receipt of the account identifier of Record B', the server system may use the account identifier of Record B' to transfer the funds associated with the refund to the account corresponding to Record B'.

As a further example, where the funds (or at least a portion thereof) associated with the refund was previously transferred from Record A to Record B (e.g., from/to their respective corresponding accounts associated with the same user) and then from Record B to a record of another user, the refund operations may result in the funds being transferred to Record B', as discussed above. In one scenario, the server system may automatically transfer the funds to Record A' or one or more other records associated with the user (e.g., based on a determination that the funds initially originated from the corresponding Record A or other records corresponding to the records to which the funds are automatically transferred). Such automatic transfer may be performed by the server system without the user directing the transfer (e.g., after the refund was received) or may be based on a pre-designation by the user prior to the receipt of the refund to allocate such refund to Record A' or the other records). In another scenario, the funds may remain at the account corresponding to Record B' until the user performs one or more commands to transfer funds from Record B' to Record A' (or from Record B' to another record associated with the user or another user) (e.g., via performance of "reciprocal corresponding transfer commands" or other commands by the user).

Figure 4:
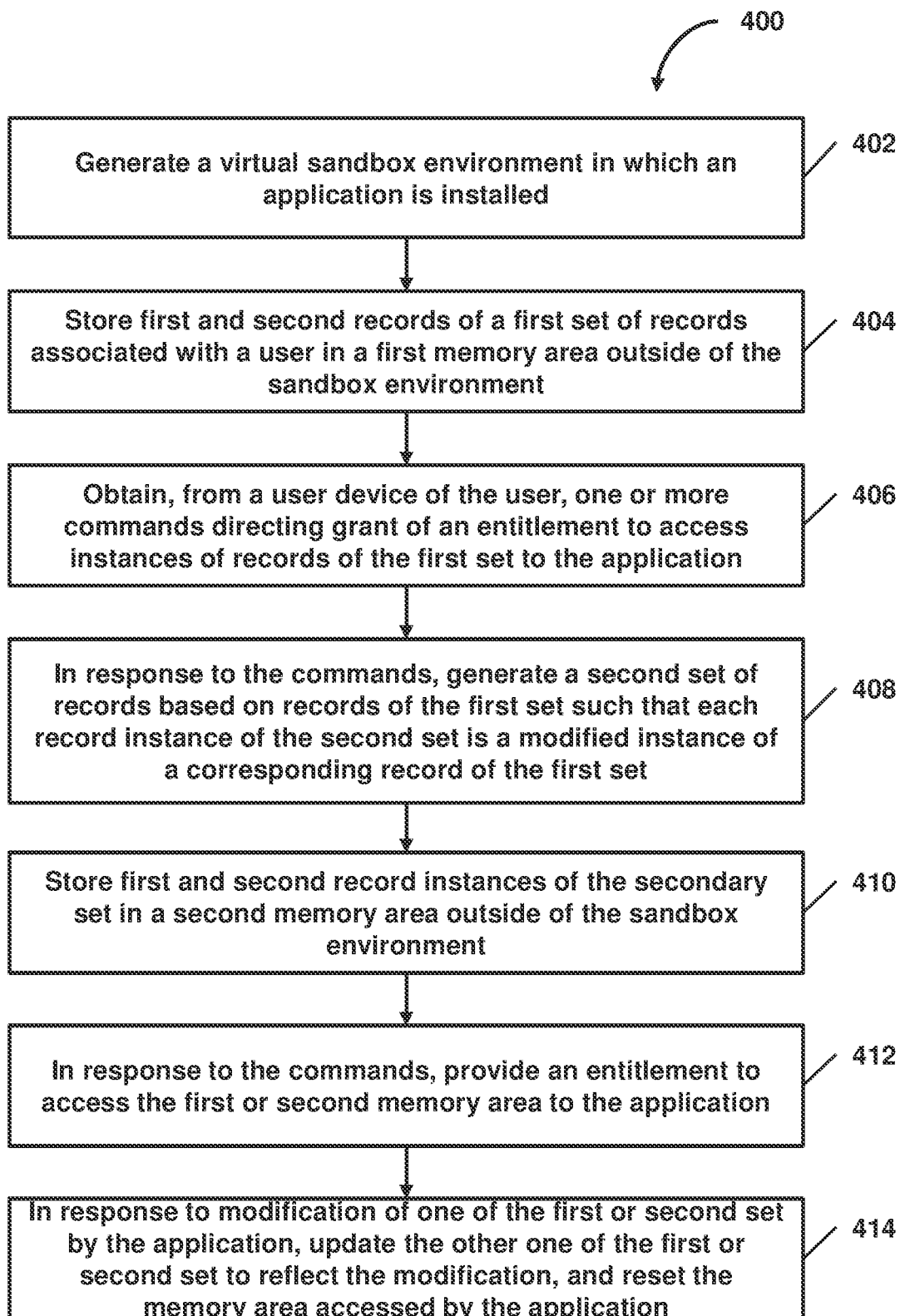
FIG. 4 shows a flowchart of a method for facilitating resource allocation via multi-transfer of the resource from modified instances of corresponding records in memory, in accordance with one or more embodiments.
Figure 5:
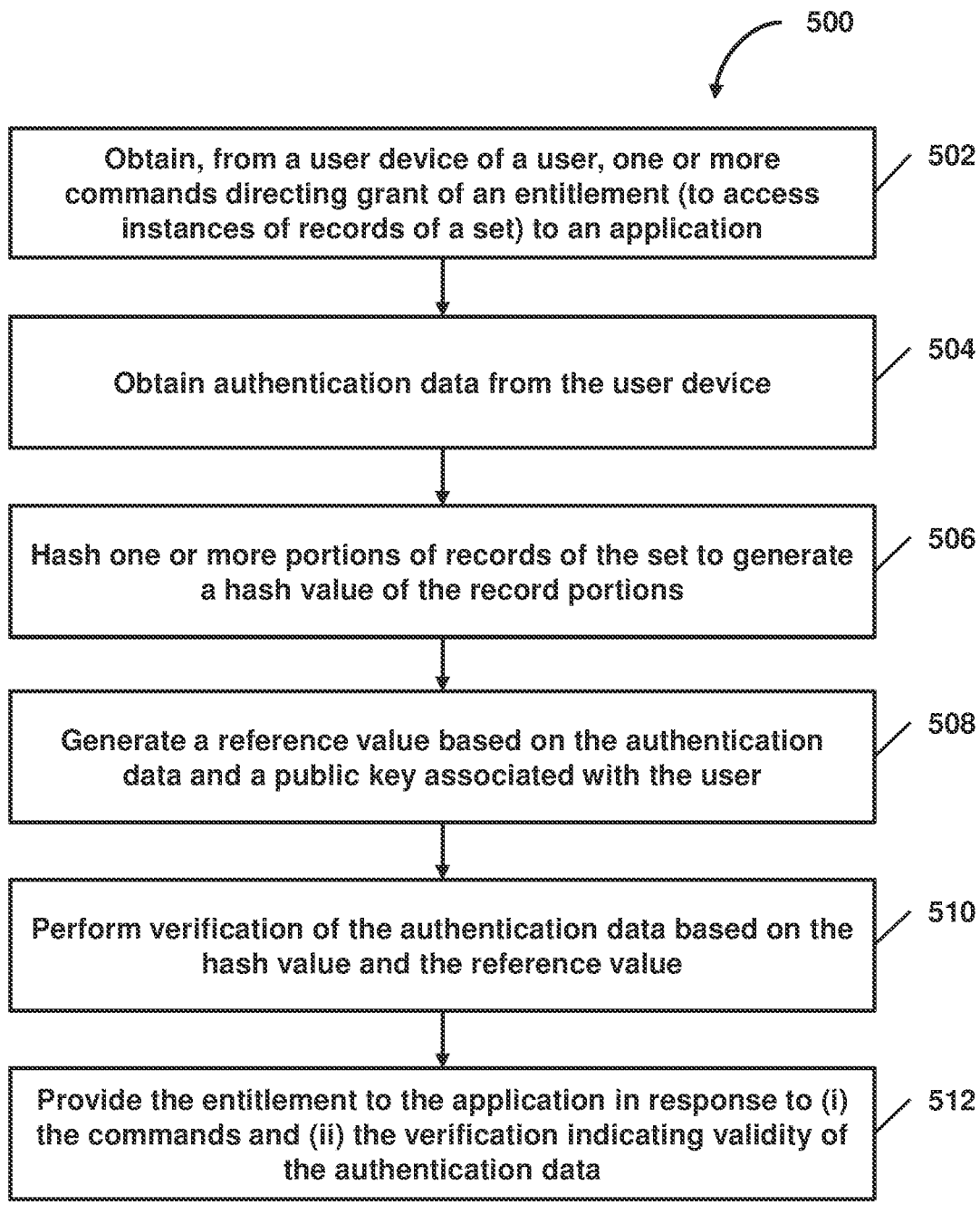
FIG. 5 shows a flowchart of a method for facilitating granting of an entitlement to an application, in accordance with one or more embodiments.

FIGS. 4 and 5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for facilitating resource allocation via multi-transfer of the resource from modified instances of corresponding records in memory, in accordance with one or more embodiments. In operation 402, a virtual sandbox environment may be generated. As an example, the virtual sandbox environment may be a virtual space via which a tightly controlled set of resources are provided for one or more applications to execute and operate. Network access and the ability to access resources outside of the virtual sandbox environment may be disabled or otherwise restricted by default. In one use case, the virtual sandbox environment may be configured to prevent an application installed therein from accessing a resource outside of the virtual sandbox environment without one or more entitlements assigned to the application to access the resource. Operation 402 may be performed by a subsystem that is the same as or similar to environment subsystem 112, in accordance with one or more embodiments.

In operation 404, first and second records of a first set of records associated with a user may be stored in a first memory area outside of the virtual sandbox environment. As an example, each record of the first set may include a record identifier, a resource amount, a creation time (e.g., a creation date/time), a modification time (e.g., last modified date/time), one or more references to one or more associated records, or other data. Operation 404 may be performed by a subsystem that is the same as or similar to subsystem record subsystem 114, in accordance with one or more embodiments.

In operation 406, one or more commands may be obtained from a user device of the user, where the commands from the user device direct grant of an entitlement to access instances of records of the first set or provide other instructions. As an example, the commands may direct one or more allocations or reallocations of resources or resource amounts or other modifications related to one or more records or instances of such records. Operation 406 may be performed by a subsystem that is the same as or similar to program interface subsystem 122, in accordance with one or more embodiments.

In operation 408, in response to the commands, a second set of records associated with the user may be generated based on records of the first set such that each record of the second set is a modified instance of a corresponding record of the first set. As an example, a record instance of the second set may be generated such that at least a record identifier of the generated record instance may be different from the record identifier of the corresponding record of the first set. Additionally, or alternatively, a resource amount or other parameter value of the generated record instance may be different from the resource amount or other parameter value of the corresponding record of the first set. Operation 408 may be performed by a subsystem that is the same as or similar to instance generation subsystem 116, in accordance with one or more embodiments.

In operation 410, first and second record instances of the second set may be stored in a second memory area outside of the virtual sandbox environment. As indicated above, each record of the second set may (i) be a modified instance of a corresponding record of the first set and (ii) include a record identifier, a resource amount, a creation time, a modification time, one or more references to one or more associated records, or other data. As an example, the record identifier of the first record instance may be different from the record identifier of a record of the first set that corresponds to the first record instance, and the record identifier of the second record instance may be different from the record identifier of a record of the first set that corresponds to the second record instance. Operation 410 may be performed by a subsystem that is the same as or similar to record subsystem 114, in accordance with one or more embodiments.

In operation 412, in response to the commands, an entitlement to access the first or second memory area may be provided to the application. As an example, upon being assigned an entitlement to access the first memory area, the application may cause modification of the first and second records in the first memory area. In one use case, where the commands direct (i) a first transfer of at least some of the resource amount of the first record to the second record and (ii) then a second transfer of at least some of the resource amount of the second record to one or more records associated with one or more other users, the application may cause modification of the first and second records in the first memory area to reflect the first and second transfers. Operation 412 may be performed by a subsystem that is the same as or similar to access subsystem 118, in accordance with one or more embodiments.

In operation 414, in response to the modification of one of the first or second set of records by the application, the other one of the first or second set of records may be updated to reflect the modification, and the memory area accessed by the application's modification may be reset. As an example, as part of the reset, the entitlement assigned to the application may be removed. As a further example, the reset may cause the first and second records of the first set to be deleted from the first memory area. In one use case, for example, the first memory area may be reformatted, thereby erasing all data pertaining to the first and second records of the first set from the first memory area. Operation 414 may be performed by a subsystem that is the same as or similar to record subsystem 114, in accordance with one or more embodiments.

FIG. 5 shows a flowchart of a method 500 for facilitating granting of an entitlement to an application, in accordance with one or more embodiments. In operation 502, one or more commands may be obtained from a user device of a user, where the commands from the user device direct grant of an entitlement to access instances of records of a record set or provide other instructions. Operation 502 may be performed by a subsystem that is the same as or similar to program interface subsystem 122, in accordance with one or more embodiments.

In operation 504, authentication data may be obtained from the user device. As an example, the authentication data may include a token, a digital signature, instances of records (e.g., of the record set), or other data used to indicate that the user is an owner of the records of the record set or one or more resources related to the records. In one use case, the user device may store one or more local copies of the records of the record set in persistent storage of the user device, and the user device may generate the authentication data based on one or more portions of such local record copies stored at the user device. Operation 504 may be performed by a subsystem that is the same as or similar to program interface subsystem 122, in accordance with one or more embodiments.

In operation 506, one or more portions of the records (of the record set) may be hashed to generate a hash value of the record portions. As an example, all the record identifiers of the records may be combined in a specified order, and the ordered combination may be provided as input to a one-way hash function to output the hash value. Operation 506 may be performed by the subsystem that is the same as or similar to cryptographic subsystem 120, in accordance with one or more embodiments.

In operation 508, a reference value may be generated based on the authentication data and a public key associated with the user. As an example, the public key may be used to decrypt the authentication data to generate the reference value. Operation 508 may be performed by a subsystem that is the same as or similar to cryptographic subsystem 120, in accordance with one or more embodiments.

In operation 510, verification of the authentication data may be performed based on the hash value and the reference value. As an example, the verification may include comparing the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate that the authentication data is valid. A similarity score of FALSE may indicate that the authentication data is invalid. Operation 510 may be performed by a subsystem that is the same as or similar to cryptographic subsystem 120, in accordance with one or more embodiments.

In operation 512, the entitlement may be provided to the application in response to (i) the commands and (ii) the verification indicating validity of the authentication data. As an example, if a match between the hash value and the reference value is confirmed, the verification may output an indication that the authentication data is valid. Operation 512 may be performed by a subsystem that is the same as or similar to access subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, or other electronic storages), one or more physical processors programmed with one or more computer program instructions, circuitry, and/or other components. The computing devices may include communication lines or ports to enable the exchange of information within a network (e.g., network 152) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-122 or other subsystems (or components described in U.S. patent application Ser. No. 15/833,660, filed on Dec. 6, 2017, or U.S. patent application Ser. No. 17/013,442, filed on Sep. 4, 2020, each of which is hereby incorporated herein by reference in its entirety). The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-122 described herein is for illustrative purposes, and is not intended to be limiting, as any of subsystems 112-122 may provide more or less functionality than is described. For example, one or more of subsystems 112-122 may be eliminated, and some or all of its functionality may be provided by other ones of subsystems 112-122. As another example, additional subsystems may be programmed to perform some or all of the functionality attributed herein to one of subsystems 112-122.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

A1. A method comprising: obtaining, from a first user device of a first user, a request related to one or more records of a first set of records; generating one or more records of a second set of records based on the request and the one or more records of the first set; and providing, based on the request, an entitlement to an application to enable access to the one or more records of the first or second set, the application modifying the one or more records of the first or second set to reflect a transfer of at least some of a resource amount of at least one record to at least another record.

A2. The method of embodiment A1, wherein the first and second sets are associated with a second user, the method further comprising: obtaining, from a second user device of the second user, one or more commands directing acceptance of at least some of a resource amount of a record associated with the first user into at least one record of the first or second set associated with the second user; and providing, based on the request and the one or more commands from the second user device, the entitlement to the application to enable access to at least one record of the first or second set, the application modifying the one or more records of the first or second set to reflect a transfer of at least some of a resource amount of the record associated with the first user to at least one record of the first or second set associated with the second user.

A3. The method of the immediately preceding embodiment, wherein the request from the first user device comprises one or more commands directing a transfer of at least some of a resource amount of the record associated with the first user to at least one record of the first or second set associated with the second user.

A4. The method of any of embodiments of A2 or dependent therefrom, wherein generating the one or more records of the second set of records comprises generating the one or more records of the second set of records based on the one or more commands from the second user device, the request, and the one or more records of the first set.

A5. The method of embodiment A1, wherein the first and second sets are associated with the first user, wherein the request from the first user device comprises one or more commands directing a transfer of at least some of a resource amount of a record associated with the first user to at least one record of the first or second set associated with the first user; and wherein providing the entitlement comprises providing, based on the one or more commands from the first user device, the entitlement to the application to enable access to at least one record of the first or second set, the application modifying the one or more records of the first or second set to reflect a transfer of at least some of the resource amount of the record associated with the first user to at least one record of the first or second set associated with the second user.

A6. The method of the immediately preceding embodiment, wherein the one or more commands comprises (i) a command directing a transfer of at least some of the resource amount of the record associated with the first user to at least one record of the first or second set associated with the first user and (ii) a command directing an acceptance of at least some of the resource amount of the record associated with the first user into at least one record of the first or second set associated with the first user.

A7. The method of any of the preceding embodiments of A5 or dependent therefrom, wherein the one or more commands comprises (i) a command directing a transfer of at least some of a resource amount of a first record of a set of records associated with the first user to a second record of the set of records and (ii) a command directing a transfer of at least some of a resource amount of the second record to another record (e.g., associated with the user or associated with another user).

A8. The method of the immediately preceding embodiment, wherein the set of records is the first or second set of records.

A9. The method of any of the preceding embodiments of A5 or dependent therefrom, wherein the one or more commands comprises (i) a command directing a transfer of at least some of a resource amount of a first record of a set of records associated with the first user to a second record of the set of records, (ii) a command directing acceptance of at least some of the resource amount of the first record to the second record, and (iii) a command directing a transfer of at least some of a resource amount of the second record to another record (e.g., associated with the user or associated with another user).

A10. The method of any of the preceding embodiments of A1 or dependent therefrom, further comprising: storing the first set of records in a first memory area, each record of the first set comprising a resource amount and a record identifier; and storing first and second records of the second set in one or more memory areas.

A11. The method of the immediately preceding embodiment, wherein storing the first and second records comprises storing the first and second records of the second set in second and third memory areas, respectively.

A12. The method of any of the preceding embodiments of A1 or dependent therefrom, wherein each record of the second set is a modified instance of a corresponding record of the first set, the record of the second set comprises a record identifier and a resource amount.

A13. The method of the immediately preceding embodiment, wherein the record identifier of each record of the second set is different from the record identifier of the corresponding record of the first set.

A14. The method of any of the preceding embodiments of A1 or dependent therefrom, further comprising: in response to the application modifying the one or more records of one of the first or second set, updating the other one of the first or second set to reflect the transfer of at least some of a resource amount of at least one record to at least another record.

A15. The method of any of the preceding embodiments of A1 or dependent therefrom, further comprising: in response to the application modifying the one or more records of one of the first or second set, resetting the memory area(s) in which the one or more records of the other one of the first or second set are stored.

A16. The method of the immediately preceding embodiment, wherein the resetting causes removal of the entitlement from the application.

A17. The method of any of the preceding embodiments of A15 or dependent therefrom, wherein the resetting comprises deletion of the one or more records stored in the resetted memory area.

A18. The method of any of the preceding embodiments of A10 or dependent therefrom, further comprising: generating a virtual sandbox environment in which the application is installed, the virtual sandbox environment configured to prevent the application from accessing a resource outside of the virtual sandbox environment without an entitlement assigned to the application to access the resource.

A19. The method of the immediately preceding embodiment, further comprising: initializing the first memory area and the one or more memory areas outside of the virtual sandbox environment such that the application has no entitlement to data stored in the memory areas.

A20. The method of any of the preceding embodiments of A1 or dependent therefrom, wherein the application being configured to receive requests from a user to initiate an update related to a record associated with the user.

A21. The method of any of the preceding embodiments of A10 or dependent therefrom, wherein the first memory area is designated as a primary memory area, and wherein each of the one or more memory areas is designated as a secondary memory area.

A22. The method of any of the preceding embodiments of A10 or dependent therefrom, wherein the first memory area is within a first virtual sandbox environment, and the application is installed in a virtual sandbox environment different from the first virtual sandbox environment.

A23. The method of the immediately preceding embodiment, wherein the one or more memory areas are within one or more virtual sandbox environments different from the first virtual sandbox environment.

A24. The method of any of the preceding embodiments of A1 or dependent therefrom, further comprising: prior to performing one or more operations related to the request, determining a match between authentication data stored at the user device and the first or second set (or portions thereof).

A25. The method of any of the preceding embodiments of A1 or dependent therefrom, wherein providing the entitlement to the application comprises providing the entitlement to the application based on a match between authentication data stored at the user device and the first or second set (or portions thereof).

A26. The method of the immediately preceding embodiment, further comprising: obtaining the authentication data from a user device (e.g., of a user with which a record to be modified is associated); and performing verification of the authentication data based on the first or second set, wherein providing the entitlement to the application comprises providing the entitlement to the application based on the verification indicating the match between the authentication data and the first or second set (or portions thereof).

A27. The method of the immediately preceding embodiment, further comprising: hashing the one or more records of the first or second set to generate a hash value (e.g., of the one or more records of the first or second set); and generating a reference value based on the authentication data and a public key associated with the user, wherein performing the verification of the authentication data comprises performing the verification of the authentication data based on the hash value and the reference value.

A28. The method of any of embodiments of A14 or dependent therefrom, further comprising: determining a match between confirmation data generated at the user device and the first or second set (or portions thereof) subsequent to the modification of the one or more records of one of the first or second set or the updating of the other one of the first or second set.

A29. The method of the immediately preceding embodiment, further comprising: resetting the memory area(s) in which the one or more records of the other one of the first or second set are stored, the resetting being based on the match between the confirmation data and the first or second set (or portions thereof).

A30. The method of the immediately preceding embodiment, wherein the resetting causes removal of the entitlement from the application.

A31. The method of any of the preceding embodiments of A29 or dependent therefrom, wherein the resetting deletion of the one or more records stored in the resetted memory area.

A32. The method of any of the preceding embodiments of A29 or dependent therefrom, further comprising: obtaining the confirmation data from the user device; performing verification of the confirmation data based on the first or second set (or portions thereof), wherein resetting the memory areas(s) comprises resetting the memory area(s) in which the one or more records of the other one of the first or second set are stored based on the verification indicating the match between the confirmation data and the first or second set (or portions thereof).

A33. The method of the immediately preceding embodiment, further comprising: hashing the one or more records of the first or second set to generate a hash value (e.g., of the one or more records of the first or second set); and generating a reference value based on the confirmation data and a public key associated with the user, wherein performing the verification of the confirmation data comprises performing the verification of the confirmation data based on the hash value and the reference value.

A34. The method of any of the preceding embodiments of A14 or dependent therefrom, further comprising: obtaining a subsequent request related to modification of a given record of the first set; and causing the modification indicated in the subsequent request to be performed on a record of the second set that corresponds to the given record of the first set.

A35. The method of the immediately preceding embodiment, wherein the subsequent request is obtained subsequent to removal of the given record of the first set from the respective memory area (in which the given record was stored) or archiving of the given record.

A36. The method of any of the preceding embodiments of A34 or dependent therefrom, wherein the record of the second set is a modified instance of the given record of the first set.

A37. The method of any of the preceding embodiments of A34 or dependent therefrom, wherein the subsequent request indicates a given record identifier of the given record of the first set, the method further comprising: determining a record identifier of the record of the second set based on the given record identifier; and causing, based on the record identifier, the modification indicated in the subsequent request to be performed on the record of the second set.

A38. The method of the immediately preceding embodiment, further comprising: determining a common identifier associated with the given record identifier; and determining the record identifier of the record of the second set based on the common identifier also being associated with the record identifier of the record of the second set.

A39. The method of any of the preceding embodiments of A34 or dependent therefrom, wherein the modification indicated in the subsequent request comprises a transfer of at least some of a resource amount of a record to the given record of the first set, the method further comprising: subsequent to obtaining the subsequent request, obtaining one or more commands from a user device directing acceptance of at least some of a resource amount of a record into the given record of the first set; and causing, based on the one or more commands from the user device, the modification indicated in the subsequent request to be performed on the record of the second set.

B1. A method comprising: receiving, from a computing device associated with a payer, biller data associated with a biller for a payment transaction between the payer and the biller, the biller data comprising at least one of a cost of the payment transaction or an identifier of the payment transaction; determining, availability of funds in accounts associated with the payer for completing the payment transaction based on the received biller data; providing, to the computing device associated with the payer, a selection of one or more of the accounts having sufficient available funds to use for payment; providing, to a computing device associated with the biller, an indication of the availability of the funds; receiving, from the computing device associated with the payer, a payer command to initiate a payment to the biller from the one or more selected accounts via another account associated with the payer, the one or more selected accounts and the other account associated with the payer being accounts held at a same institution; transferring, based on the payer command, at least a portion of the funds from the one or more selected accounts into the other account associated with the payer; and transferring, based on the payer command, the at least a portion of the funds from the other account associated with the payer to the biller to complete the payment transaction without the computing device associated with the biller receiving sensitive information regarding the one or more selected accounts.

B2. The method of the immediately preceding embodiment, wherein the other account comprises a modified demand deposit account associated with the payer such that the method comprises: transferring, based on the payer command, the at least a portion of the funds from the one or more selected accounts into the modified demand deposit account associated with the payer; and; transferring, based on the payer command, the at least a portion of the funds from the modified demand deposit account associated with the payer, into the account associated with the biller, to complete the payment transaction without the computing device associated with the biller receiving sensitive information regarding the one or more selected accounts.

B3. The method of any of the preceding embodiments of B2 or dependent therefrom, wherein the modified demand deposit account associated with the payer is configured to draw down funds only from one or more other accounts associated with the payer, such that the drawn down funds are only received into the modified demand deposit account associated with the payer when the payer directs corresponding funds from the one or more other accounts associated with the payer, wherein the modified demand deposit account associated with the payer is configured to receive funds directed from the one or more other accounts associated with the payer, such that the directed funds are only received into the modified demand deposit account associated with the payer when the payer draws down corresponding funds from the one or more other accounts associated with the payer.

B4. The method of any of the preceding embodiments of B2 or dependent therefrom, wherein each of the accounts associated with the payer is configured to be drawn down only by one or more modified demand deposit accounts associated with the payer, wherein each of the accounts associated with the payer is configured to direct funds only into the one or more modified demand deposit accounts associated with the payer.

B5. The method of any of the preceding embodiments of B2 or dependent therefrom, wherein the modified demand deposit account associated with the payer is configured to receive the at least a portion of the funds for the payment to the biller (i) only when the payer, only by payer direct command, draws down at least some funds from the one or more selected accounts, into the modified demand deposit account associated with the payer and (ii) only after the payer, only by payer direct command, first directs at least some funds from the one or more selected accounts, into the modified demand deposit account associated with the payer, and wherein the modified demand deposit account associated with the payer is configured to receive the at least a portion of the funds for the payment to the biller (i) only when the payer, only by payer direct command, directs at least some funds from the one or more selected accounts, into the modified demand deposit account associated with the payer and (ii) only after the payer, only by payer direct command, first draws down at least some funds from the one or more selected accounts, into the modified demand deposit account associated with the payer.

C1. A method comprising: detecting, via pattern recognition by a user application of the user device, a pattern indicative of a given code type, the pattern being presented on a physical object; causing, via the user application, a code scanning application independent from the user application to be launched based on the detection of the pattern indicative of the given code type to scan the pattern presented on the physical object; obtaining, via the user application, a code of the given code type from the code scanning application based on the code scanning application's scan of the pattern, the code being associated with a biller entity; and causing, via the user application, the code or information derived from the code to be provided over the Internet to a computer system hosting one or more accounts of a user of the user application, the code or the information derived from the code being used by the computer system to complete one or more transactions between the biller entity and at least one of the one or more accounts.

C2. The method of the immediately preceding embodiment, further comprising: obtaining, via a sensor of the user device, an image stream comprising the pattern presented on the physical object; and providing the image stream to a neural network associated with the user application to detect that the pattern is indicative of the given code type.

C3. The method of any of the preceding embodiments of C1 or dependent therefrom, further comprising: obtaining, via the user application, a user input specifying pattern/code scanning, the user input being obtained subsequent to the code scanning application being launched based on the detection in an active state running as one or more background processes of the user device; and causing, via the user application, based on the user input, the code scanning application to run as one or more foreground processes of the user device to scan the pattern presented on the physical object.

C4. The method of any of the preceding embodiments of C1 or dependent therefrom, further comprising: determining whether a predetermined threshold number of codes has been obtained, the predetermined threshold number of codes being greater than one code; and causing, based on a determination that the predetermined threshold number of codes has been obtained, the code or the information derived from the code and one or more other codes or information derived from the one or more other codes to be provided over the Internet to the computer system.

C5. The method of any of the preceding embodiments of C1 or dependent therefrom, further comprising: determining whether a predetermined threshold number of codes has been obtained, the predetermined threshold number of codes being greater than one code; and performing one or more actions based on a determination that the predetermined threshold number of codes has been obtained such that none of the one or more actions are performed prior to the predetermined threshold number of codes being obtained, the one or more actions comprising (i) processing the code and one or more other codes to determine information corresponding to the respective codes, (ii) initiating one or more queries to one or more sources to obtain results corresponding to the respective codes, or (iii) using the determined information to compile billing information.

C6. The method of any of the preceding embodiments of C1 or dependent therefrom, further comprising: determining whether a predetermined threshold number of codes has been obtained, the predetermined threshold number of codes being greater than one code; and performing, based on a determination that the predetermined threshold number of codes has been obtained, one or more queries to one or more sources to obtain results corresponding to the respective codes such that none of the one or more queries are performed prior to the predetermined threshold number of codes being obtained.

C7. The method of any of the preceding embodiments of C1 or dependent therefrom, further comprising: determining whether a predetermined threshold amount of time has passed since obtaining at least one code from the code scanning application; and causing, based on a determination that the predetermined threshold amount of time has passed, the code or the information derived from the code and one or more other codes or information derived from the one or more other codes to be provided over the Internet to the computer system.

C8. The method of any of the preceding embodiments of C1 or dependent therefrom, further comprising: determining whether a predetermined threshold amount of time has passed since obtaining at least one code from the code scanning application; and performing one or more actions based on a determination that the predetermined threshold amount of time has passed such that none of the one or more actions are performed prior to the passing of the predetermined threshold amount of time, the one or more actions comprising (i) processing the code and one or more other codes to determine information corresponding to the respective codes, (ii) initiating one or more queries to one or more sources to obtain results corresponding to the respective codes, or (iii) using the determined information to compile billing information.

C9. The method of any of the preceding embodiments of C1 or dependent therefrom, further comprising: determining whether a predetermined threshold amount of time has passed since obtaining at least one code from the code scanning application; and performing, based on a determination that the predetermined threshold amount of time has passed, one or more queries to one or more sources to obtain results corresponding to the respective codes such that none of the one or more queries are performed prior to the passing of the predetermined threshold amount of time.

C10. The method of any of the preceding embodiments of C1 or dependent therefrom, further comprising: obtaining, via the user application, fund availability information from the computer system over the Internet, the fund availability information indicating the one or more accounts as having sufficient available funds to complete the one or more transactions; and causing, via the user application, a selection of at least one account of the one or more accounts to use for payment to complete the one or more transactions to be provided to the computer system over the Internet.

D1. A method comprising: exposing, using a plurality of electromagnetic light emitters, an item to electromagnetic light; capturing, using a plurality of image sensors, a plurality of images of the item exposed to the electromagnetic light; recognizing a first pattern in at least one image of the plurality of images, the first pattern including encoded information associated with the item and the first pattern being visible only in response to the exposure of the item to the electromagnetic light; decoding the information associated with the item; and identifying the item based on the decoded information.

D2. The method of the immediately preceding embodiment, wherein the plurality of electromagnetic light emitters are arranged throughout an enclosed structure such that a first electromagnetic light emitter is arranged at a first location proximate a first opening of the enclosed structure and a second electromagnetic light emitter is arranged at a second location proximate a second opening of the enclosed structure.

D3. The method of any of the preceding embodiments of D1 or dependent therefrom, wherein the plurality of image sensors are arranged throughout the enclosed structure.

D4. The method of any of the preceding embodiments of D1 or dependent therefrom, wherein the plurality of cameras are arranged throughout the tunnel structure in between the plurality of UV light emitters such that at least one camera is arranged between the first location and the second location of the tunnel structure.

D5. The method of any of the preceding embodiments of D1 or dependent therefrom, further comprising: detecting, using a sensor, the item, the sensor being arranged proximate the first opening of the enclosed structure; and in response to a detection of the item, causing at least the first electromagnetic light emitter and a first image sensor proximate the first opening to turn on.

D6. The method of any of the preceding embodiments of D1 or dependent therefrom, wherein recognizing the first pattern includes: recognizing a first portion of a pattern in a first image of the plurality of images and recognizing a second portion of the pattern in a second image of the plurality of images; and merging the first portion and the second portion to recognize the first pattern.

D7. The method of any of the preceding embodiments of D1 or dependent therefrom, wherein recognizing the first pattern includes: recognizing the first pattern in a first image of the plurality of images; and discarding one or more other images of the plurality of images in response to the recognition of the first pattern in the first image.

D8. The method of any of the preceding embodiments of D1 or dependent therefrom, further comprising: detecting a size of the item; and determining an intensity of the electromagnetic light radiated by the plurality of electromagnetic light emitters based on the detected size of the item.

D9. The method of any of the preceding embodiments of D1 or dependent therefrom, further comprising: detecting a size of the item; and determining a focal length of the plurality of image sensors based on the detected size of the item.

D10. The method of any of the preceding embodiments of D1 or dependent therefrom, further comprising: detecting a location of the item; and determining an intensity of the electromagnetic light radiated by the plurality of electromagnetic light emitters based on the detected location of the item.

D11. The method of any of the preceding embodiments of D1 or dependent therefrom, further comprising: detecting a location of the item; and determining a focal length of the plurality of image sensors based on the detected location of the item.

E1. A tangible, non-transitory, machine-readable medium storing instructions that, when executed by a data processing apparatus, causes the data processing apparatus to perform operations comprising those of any of the preceding method embodiments.

E2. A system comprising: one or more processors; and memory storing instructions that, when executed by the processors, cause the processors to effectuate operations comprising those of any of the preceding method embodiments.

What is claimed is:

1. A computer system for facilitating multi-transfer of a resource, the system comprising:
   one or more physical processors programmed with computer program instructions that, when executed, cause operations comprising:
      storing first and second records of a first set of records associated with a user in a first memory area, each record of the first set comprising a record identifier and a resource amount;
      in response to a user application of a user device of the user (i) scanning a graphic indicia that indicates a transfer to one or more other records associated with one or more users and (ii) generating a request directing a resource transfer to the one or more other records, obtaining, from the user application of the user device of the user, the user-application-generated request, the user-application-generated request comprising one or more commands directing (i) grant of an entitlement to an application to access the first and second records of the first set, (ii) a first transfer of at least some of the resource amount of the first record in the first memory area to the second record in the first memory area, and (iii) then a second transfer of at least some of the resource amount of the second record in the first memory area to the one or more other records;
      obtaining authentication data from the user device, wherein the authentication data is generated by the user device based on record copies of the first set stored on the user device, the record copies stored on the user device having account identifiers of accounts of the user and account resource amounts of the accounts of the user that are the same as corresponding account identifiers and corresponding account resource amounts of the records of the first set stored in the first memory area;
      performing verification of the authentication data using a hash-based value derived from hashing of a combination of inputs comprising a first account identifier and account resource amount of the first record stored in the first memory area and a second account identifier and account resource amount of the second record stored in the first memory area; and
      in response to (i) the user-application-generated request comprising the one or more commands and (ii) the verification indicating a match between the authentication data and the hash-based value derived from the hashing of the combination of inputs, providing the entitlement to access the first memory area to the application, the application modifying the first record in the first memory area and the second record in the first memory area to reflect the first transfer and the second transfer.

2. The system of claim 1, wherein the user device generates the one or more commands and modifies the record copies of the first set stored on the user device to reflect the first transfer and the second transfer directed by the one or more commands, and wherein the user device generates hash-based confirmation data based on the modified record copies of the first set and transmits the hash-based confirmation data to a web service.

3. The system of claim 1, wherein the first record corresponds to a first account of the user, and the second record corresponds to a second account of the user.

4. The system of claim 1, wherein the user device modifies the record copies of the first set stored on the user device to reflect the first transfer and the second transfer directed by the one or more commands, the operations further comprising:
obtaining confirmation data generated by the user device, wherein the confirmation data is generated by the user device based on the modified record copies of the first set;
performing confirmation verification of the confirmation data using a second hash-based value derived from hashing of a second combination of inputs comprising a third account identifier and account resource amount of a modified first instance of the first record and a fourth account identifier and account resource amount of a modified second instance of the second record; and
in response to the confirmation verification indicating that the confirmation data matches the second hash-based value derived from the hashing of the second combination of inputs, deleting the first and second records of the first set from the first memory area.

5. A method comprising:
storing first and second records of a first set of records associated with a user in a first memory area, each record of the first set comprising a record identifier and a resource amount;
in response to a user application of a user device of the user generating a request directing a resource transfer to one or more other records associated with one or more users, obtaining, from the user device of the user, the request, the request comprising one or more commands directing (i) grant of an entitlement to one or more applications to access the first and second records of the first set, (ii) a first transfer of at least some of the resource amount of the first record in the first memory area to the second record in the first memory area, and (iii) then a second transfer of at least some of the resource amount of the second record in the first memory area to the one or more other records;
obtaining authentication data from the user device, wherein the authentication data is generated by the user device based on record copies of the first set stored on the user device, the record copies stored on the user device having account identifiers of accounts of the user and account resource amounts of the accounts of the user that are the same as corresponding account identifiers and corresponding account resource amounts of the records of the first set stored in the first memory area;
performing verification of the authentication data using a hash-based value derived from hashing of a combination of inputs comprising a first account identifier and account resource amount of the first record stored in the first memory area and a second account identifier and account resource amount of the second record stored in the first memory area;
determining that the verification indicates a match between the authentication data and the hash-based value derived from the hashing of the combination of inputs; and in response to (i) the request comprising the one or more commands and (ii) the verification indicating the match between the authentication data and the hash-based value derived from the hashing of the combination of inputs, providing the entitlement to access the first and second records of the first set to the one or more applications, the one or more applications modifying the first record in the first memory area and the second record in the first memory area to reflect the first transfer and the second transfer.

6. The method of claim 5, wherein obtaining the request comprises obtaining, from the user device of the user, the request comprising (i) a first command directing the first transfer of at least some of the resource amount of the first record in the first memory area to the second record in the first memory area and (ii) a second command directing the second transfer of at least some of the resource amount of the second record in the first memory area to one or more records associated with one or more users.

7. The method of claim 5, wherein obtaining the one or more commands comprises obtaining reciprocal corresponding transfer commands from the user device associated with the user, the reciprocal corresponding transfer commands comprising (i) a first transfer command to transfer at least a first resource amount of the first record in the first memory area to the second record in the first memory area and (ii) a first acceptance command to accept the first resource amount of the first record in the first memory area into the second record in the first memory area, each of the first transfer command and the first acceptance command comprising both the respective record identifiers of the first and second records in the first memory area.

8. The method of claim 5, wherein the user device modifies the record copies of the first set stored on the user device to reflect the first transfer and the second transfer directed by the one or more commands, the method further comprising:
obtaining confirmation data generated by the user device, wherein the confirmation data is generated by the user device based on the modified record copies of the first set;
performing confirmation verification of the confirmation data using a second hash-based value derived from hashing of a second combination of inputs comprising a third account identifier and account resource amount of a modified first instance of the first record and a fourth account identifier and account resource amount of a modified second instance of the second record;
determining that the confirmation verification indicates that the confirmation data matches the second hash-based value derived from the hashing of the second combination of inputs; and
in response to the confirmation verification indicating that the confirmation data matches the second hash-based value derived from the hashing of the second combination of inputs, deleting the first and second records of the first set from the first memory area.

9. The method of claim 8, wherein performing the verification of the authentication data comprises:
generating the hash-based value by hashing the combination of inputs comprising the first account identifier and account resource amount of the first record stored in the first memory area and the second account identifier and account resource amount of the second record stored in the first memory area;

generating a reference value based on the authentication data from the user device and a public key associated with the user; and performing the verification of the authentication data based on the hash-based value and the reference value.

10. The method of claim 8, wherein the user device generates the one or more commands and modifies the record copies of the first set stored on the user device to reflect the first transfer and the second transfer directed by the one or more commands, and wherein the user device generates hash-based confirmation data based on the modified record copies of the first set and transmits the hash-based confirmation data to a web service.

11. The method of claim 5, wherein the first record corresponds to a first account of the user, and the second record corresponds to a second account of the user.

12. One or more non-transitory computer-readable media storing instructions that, when executed by one or more processors, cause operations comprising:

storing first and second records of a first set of records associated with a user in a first memory area, each record of the first set comprising a record identifier and a resource amount;

in response to a user application of a user device of the user generating a request directing a resource transfer to one or more other records associated with one or more users, obtaining, from the user device of the user, the request, the request comprising one or more commands directing (i) grant of an entitlement to one or more applications to access the first and second records of the first set, (ii) a first transfer of at least some of the resource amount of the first record in the first memory area to the second record in the first memory area, and (iii) then a second transfer of at least some of the resource amount of the second record in the first memory area to the one or more other records;

obtaining authentication data from the user device, wherein the authentication data is generated by the user device based on record copies of the first set stored on the user device, the record copies stored on the user device having account identifiers of accounts of the user and account resource amounts of the accounts of the user that are the same as corresponding account identifiers and corresponding account resource amounts of the records of the first set stored in the first memory area;

performing verification of the authentication data using a hash-based value derived from hashing of a combination of inputs comprising a first account identifier and account resource amount of the first record stored in the first memory area and a second account identifier and account resource amount of the second record stored in the first memory area; and in response to (i) the request comprising the one or more commands and (ii) the verification indicating a match between the authentication data and the hash-based value derived from the hashing of the combination of inputs, providing the entitlement to access the first memory area to the one or more applications, the one or more applications modifying the first record in the first memory area and the second record in the first memory area to reflect the first transfer and the second transfer.

13. The media of claim 12, wherein obtaining the request comprises obtaining, from the user device of the user, the request comprising (i) a first command directing the first transfer of at least some of the resource amount of the first record in the first memory area to the second record in the first memory area and (ii) a second command directing the second transfer of at least some of the resource amount of the second record in the first memory area to one or more records associated with one or more users.

14. The media of claim 12, wherein obtaining the one or more commands comprises obtaining reciprocal corresponding transfer commands from the user device associated with the user, the reciprocal corresponding transfer commands comprising (i) a first transfer command to transfer at least a first resource amount of the first record in the first memory area to the second record in the first memory area and (ii) a first acceptance command to accept the first resource amount of the first record in the first memory area into the second record in the first memory area, each of the first transfer command and the first acceptance command comprising both the respective record identifiers of the first and second records in the first memory area.

15. The media of claim 12, wherein the user device modifies the record copies of the first set stored on the user device to reflect the first transfer and the second transfer directed by the one or more commands, the operations further comprising:

obtaining confirmation data generated by the user device, wherein the confirmation data is generated by the user device based on the modified record copies of the first set;

performing confirmation verification of the confirmation data using a second hash-based value derived from hashing of a second combination of inputs comprising a third account identifier and account resource amount of a modified first instance of the first record and a fourth account identifier and account resource amount of a modified second instance of the second record; and in response to the confirmation verification indicating that the confirmation data matches the second hash-based value derived from the hashing of the second combination of inputs, deleting the first and second records of the first set from the first memory area.

16. The media of claim 15, wherein performing the verification of the authentication data comprises:

generating the hash-based value by hashing the combination of inputs comprising the first account identifier and account resource amount of the first record stored in the first memory area and the second account identifier and account resource amount of the second record stored in the first memory area;

generating a reference value based on the authentication data from the user device and a public key associated with the user; and performing the verification of the authentication data based on the hash-based value and the reference value.

17. The media of claim 15, wherein the user device generates the one or more commands and modifies the record copies of the first set stored on the user device to reflect the first transfer and the second transfer directed by the one or more commands, and wherein the user device generates hash-based confirmation data based on the modified record copies of the first set and transmits the hash-based confirmation data to a web service.

18. The media of claim 12, wherein the first record corresponds to a first account of the user, and the second record corresponds to a second account of the user.

* * * * *